(12) United States Patent
Curello et al.

(10) Patent No.: US 7,896,934 B2
(45) Date of Patent: Mar. 1, 2011

(54) HYDROGEN GENERATING FUEL CELL CARTRIDGES

(75) Inventors: Andrew J. Curello, Hamden, CT (US); Floyd Fairbanks, Naugatuck, CT (US); Constance R. Stepan, Oxford, CT (US); Anthony Sgroi, Jr., Wallingford, CT (US); Michael Curello, Cheshire, CT (US)

(73) Assignee: Societe Bic (FR)

( * ) Notice: Subject to any disclaimer, the term of this patent is extended or adjusted under 35 U.S.C. 154(b) by 538 days.

(21) Appl. No.: 11/917,238

(22) PCT Filed: Jun. 12, 2006

(86) PCT No.: PCT/US2006/023025

§ 371 (c)(1),
(2), (4) Date: Dec. 12, 2007

(87) PCT Pub. No.: WO2006/135896

PCT Pub. Date: Dec. 21, 2006

(65) Prior Publication Data

US 2008/0216906 A1 Sep. 11, 2008

Related U.S. Application Data

(63) Continuation-in-part of application No. 11/067,167, filed on Feb. 25, 2005, now Pat. No. 7,481,858.

(60) Provisional application No. 60/689,539, filed on Jun. 13, 2005.

(51) Int. Cl.
*C10J 3/68* (2006.01)

(52) U.S. Cl. .............................. 48/61; 48/76; 48/118.5; 48/120; 48/127.9; 48/128; 48/62 R; 48/174; 422/129; 422/162; 422/211; 422/212; 422/234; 422/236; 422/238; 422/240; 422/255; 422/305

(58) Field of Classification Search .................... 48/76, 48/118.5, 120, 174, 127.9, 62 R, 128, 198.2, 48/61, 197 R; 422/162, 211, 234, 236, 238, 422/240, 129, 212, 255, 305
See application file for complete search history.

(56) References Cited

U.S. PATENT DOCUMENTS 150,995 A  5/1874  Zwietusch (Continued)

FOREIGN PATENT DOCUMENTS

EP  1375419 A2  10/2003

(Continued)

OTHER PUBLICATIONS

International Search Report and Written Opinion for PCT/US06/06182 issued on Aug. 1, 2007.

(Continued)

*Primary Examiner*—Walter D Griffin
*Assistant Examiner*—Huy-Tram Nguyen
(74) *Attorney, Agent, or Firm*—The H. T. Than Law Group

(57) ABSTRACT

A gas-generating apparatus (10) includes a reaction chamber (18) containing a solid fuel component (24) and a liquid fuel component (22) that is introduced into the reaction chamber by a fluid path, such as a tube, nozzle, or valve. The flow of the liquid fuel to the solid fuel is self-regulated. Other embodiments of the gas-generating apparatus are also disclosed.

38 Claims, 10 Drawing Sheets

U.S. PATENT DOCUMENTS

| | | | |
|---|---|---|---|
| 2,463,863 A | 3/1949 | Gibadlo | |
| 3,174,833 A | 3/1965 | Blackmer | |
| 3,607,066 A | 9/1971 | Basch et al. | |
| 3,649,360 A | 3/1972 | Bloomfield et al. | |
| 4,000,003 A | 12/1976 | Baker et al. | |
| 4,122,718 A * | 10/1978 | Gustafson | 73/304 C |
| 4,123,987 A | 11/1978 | Singerle et al. | |
| 4,261,955 A | 4/1981 | Bailey, Jr. et al. | |
| 4,261,956 A | 4/1981 | Adlhart | |
| 4,265,720 A | 5/1981 | Winstel | |
| 4,317,046 A * | 2/1982 | Holmberg | 290/1 R |
| 4,431,561 A | 2/1984 | Ovshinsky et al. | |
| 4,513,065 A | 4/1985 | Adlhart | |
| 4,713,234 A | 12/1987 | Weirich et al. | |
| 5,759,712 A | 6/1998 | Hockaday | |
| 5,823,478 A * | 10/1998 | Dunn | 244/171.1 |
| 5,906,446 A | 5/1999 | McCulloch et al. | |
| 5,958,091 A | 9/1999 | Sakai et al. | |
| 5,997,821 A * | 12/1999 | Joshi | 422/129 |
| 6,274,093 B1 * | 8/2001 | Long et al. | 422/129 |
| 6,303,009 B1 * | 10/2001 | Bossard | 204/228.4 |
| 6,326,097 B1 | 12/2001 | Hockaday | |
| 6,391,818 B1 | 5/2002 | Bonsel et al. | |
| 6,534,033 B1 | 3/2003 | Amendola et al. | |
| 6,544,400 B2 * | 4/2003 | Hockaday et al. | 205/338 |
| 6,613,471 B2 | 9/2003 | Ovshinsky et al. | |
| 6,630,266 B2 | 10/2003 | Hockaday et al. | |
| 6,645,651 B2 | 11/2003 | Hockaday et al. | |
| 6,683,025 B2 | 1/2004 | Amendola et al. | |
| 6,727,012 B2 | 4/2004 | Chen et al. | |
| 6,737,184 B2 | 5/2004 | Rusta-Sellehy et al. | |
| 6,745,801 B1 | 6/2004 | Cohen et al. | |
| 6,746,496 B1 * | 6/2004 | Kravitz et al. | 48/118.5 |
| 6,758,981 B2 | 7/2004 | Mazza et al. | |
| 6,770,186 B2 | 8/2004 | Rosenfeld et al. | |
| 6,773,470 B2 | 8/2004 | Finkelshtain et al. | |
| 6,790,416 B2 | 9/2004 | Mann et al. | |
| 6,797,667 B2 | 9/2004 | Ruth et al. | |
| 6,818,334 B2 | 11/2004 | Tsang | |
| 6,821,499 B2 | 11/2004 | Jorgensen | |
| 6,828,049 B2 | 12/2004 | Bullock et al. | |
| 6,932,847 B2 * | 8/2005 | Amendola et al. | 48/76 |
| 7,147,955 B2 * | 12/2006 | Adams | 429/34 |
| 7,537,024 B2 * | 5/2009 | Adams et al. | 137/614.04 |
| 2002/0088178 A1 | 7/2002 | Davis | |
| 2003/0194369 A1 | 10/2003 | Prasad et al. | |
| 2004/0048115 A1 | 3/2004 | Devos | |
| 2004/0067195 A1 | 4/2004 | Strizki et al. | |
| 2004/0120889 A1 | 6/2004 | Shah et al. | |
| 2004/0148857 A1 * | 8/2004 | Strizki et al. | 48/127.9 |
| 2004/0202903 A1 | 10/2004 | de Vos et al. | |
| 2004/0205997 A1 * | 10/2004 | Youngblood | 48/197 R |
| 2005/0266281 A1 * | 12/2005 | Adams et al. | 429/17 |

FOREIGN PATENT DOCUMENTS

| | | | |
|---|---|---|---|
| EP | 1396472 A2 | 3/2004 | |

OTHER PUBLICATIONS

International Search Report and Written Opinion issued in connection with parent application PCT/US2006/023025 on Jan. 23, 2007.

* cited by examiner

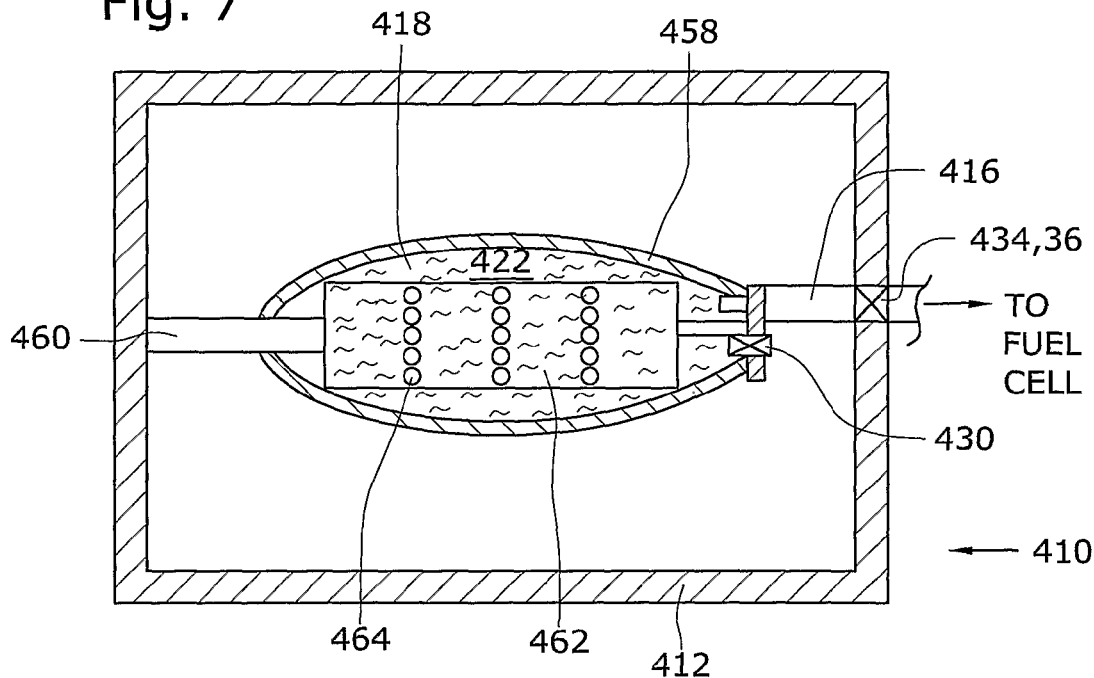
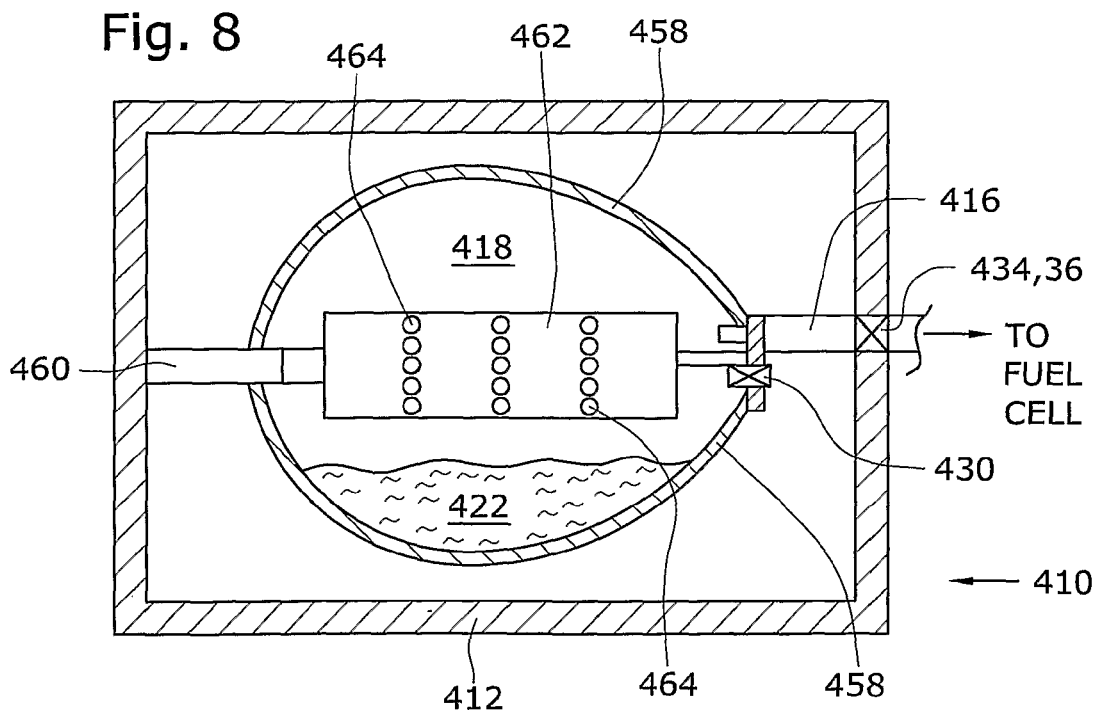

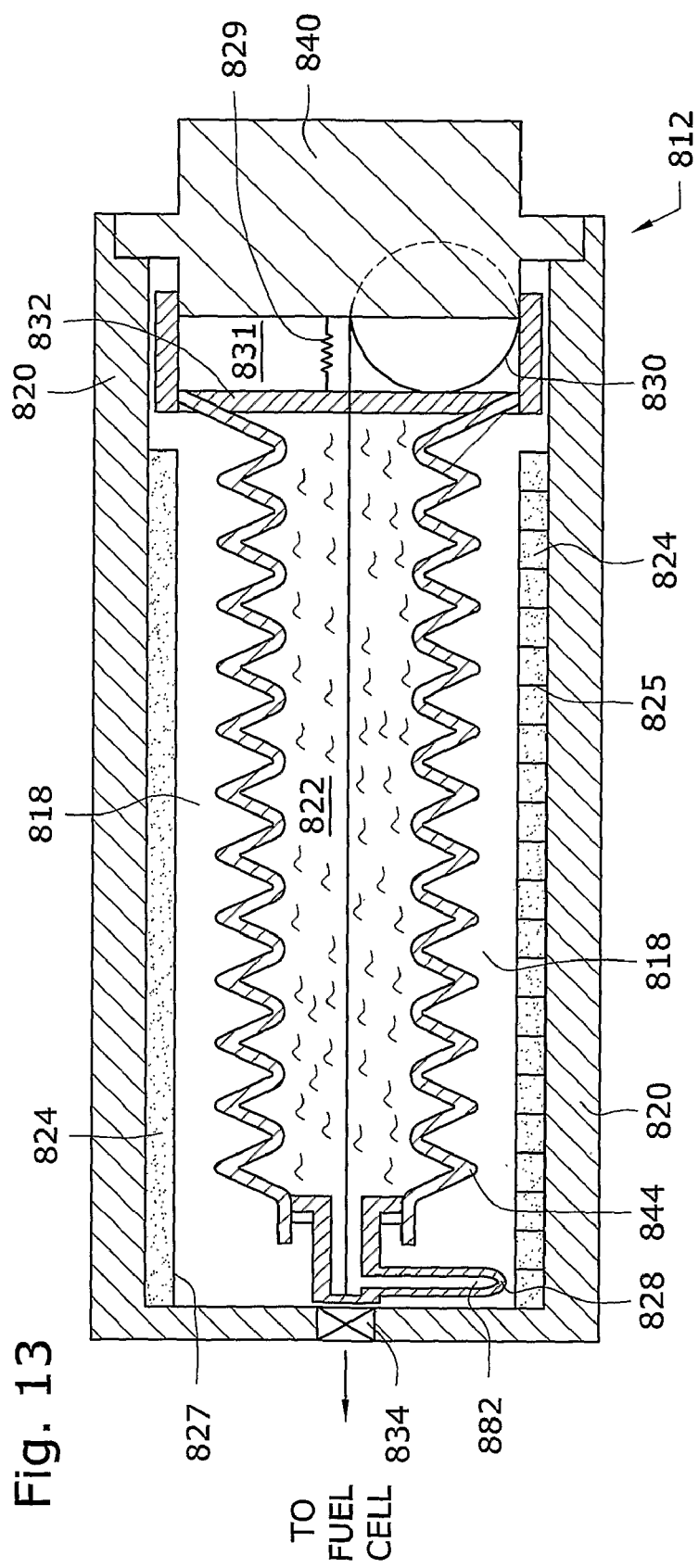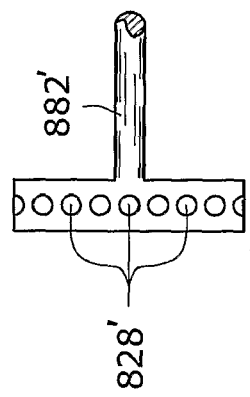
Fig. 13
Fig. 13A

HYDROGEN GENERATING FUEL CELL CARTRIDGES

CROSS-REFERENCE TO RELATED APPLICATIONS

This application claims priority to U.S. provisional patent application entitled "Hydrogen Generating Fuel Cell Cartridges," bearing Application No. 60/689,539, filed on Jun. 13, 2005, and is a continuation-in-part of patent application entitled "Hydrogen Generating Fuel Cell Cartridges," bearing application Ser. No. 11/067,167, now U.S. Pat. No. 7,481,858, filed on Feb. 25, 2005. The disclosures of these parent applications are incorporated herein by reference in their entireties.

BACKGROUND

The invention relates generally to fuel supplies for fuel cells. In particular, the invention relates to fuel cartridges for fuel cells configured to produce a fuel gas on demand.

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-Reaction at the Anode:

$$CH_3OH+H_2O \rightarrow CO_2+6H^++6e^-$$

Half-Reaction at the Cathode:

$$1.5O_2+6H^++6e^- \rightarrow 3H_2O$$

The Overall Fuel Cell Reaction:

$$CH_3OH+1.5O_2 \rightarrow CO_2+2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated by reference herein in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In a chemical metal hydride fuel cell, sodium borohydride is reformed and reacts as follows:

$$NaBH_4+2H_2O \rightarrow (\text{heat or catalyst}) \rightarrow 4(H_2)+(NaBO_2)$$

Half-Reaction at the Anode:

$$H_2 \rightarrow 2H^++2e^-$$

Half-Reaction at the Cathode:

$$2(2H^+2e^-)+O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated by reference herein in its entirety.

One of the most important features for fuel cell application is fuel storage. Another important feature is to regulate the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One disadvantage of the known hydrogen gas generators is that once the reaction starts the gas generator cartridge cannot control the reaction. Thus, the reaction will continue until the supply of the reactants run out or the source of the reactant is manually shut down.

Accordingly, a need exists to obtain a hydrogen gas generator apparatus that is capable of self-regulating the flow of at least one reactant into the reaction chamber.

SUMMARY OF THE INVENTION

An aspect of the invention is directed toward a gas-generating apparatus, which includes a reaction chamber containing a solid fuel component and a reservoir containing a liquid fuel component. A fluid path for introducing the liquid fuel component into the reaction chamber is provided. The introduction of the liquid fuel component is in response to a pressure within the reaction chamber.

Another aspect of the invention is directed toward a gas-generating apparatus, wherein the flow of liquid reactant to the reaction chamber is self-regulating.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a sectional schematic view of another alternate embodiment of a gas-generating apparatus according to the present invention having an inflatable body;

FIG. 8 is a sectional schematic view of the gas generating apparatus shown in FIG. 7 where the inflatable body is in an expanded configuration;

FIG. 13 is a sectional schematic view of another alternate embodiment of a gas-generating apparatus according to the present invention where the liquid fluid component chamber is a spring-loaded deformable bladder and FIG. 13A is a perspective view of an alternate fluid conduit.

DETAILED DESCRIPTION

Figure 1:
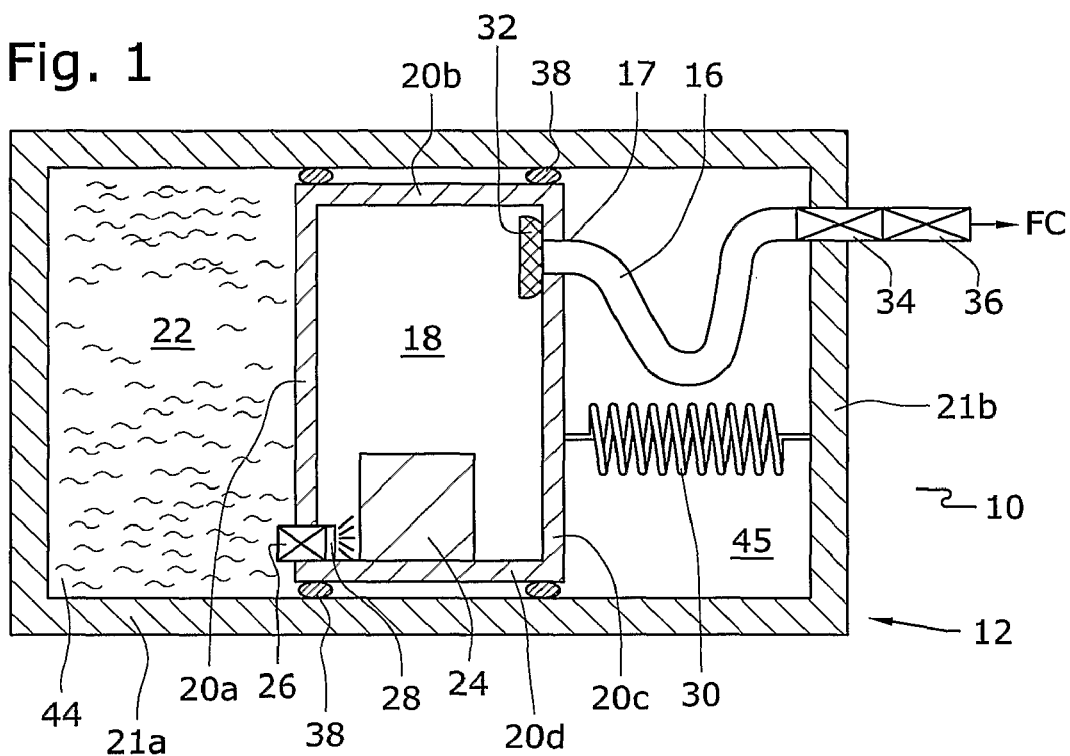
FIG. 1 is a sectional schematic view of a gas-generating apparatus according to the present invention.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated by reference herein in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. Pat. Appl. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in a U.S. provisional application entitled "Fuels for Hydrogen-Generating Cartridges" filed on Jun. 13, 2005, bearing Ser. No. 60/689,572. These references are also incorporated by reference herein in their entireties.

Fuels can also include a metal hydride such as sodium borohydride ($NaBH_4$) and water, discussed above. Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engine built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Suitable known hydrogen generating apparatus are disclosed in commonly-owned, co-pending U.S. patent application Ser. No. 10/679,756 filed on Oct. 6, 2003, Ser. No. 10/854,540 filed on May 26, 2004, Ser. No. 11/067,167 filed on Feb. 25, 2005, and Ser. No. 11/066,573 filed on Feb. 25, 2005. The disclosure of these references is incorporated herein by reference in their entireties.

The gas-generating apparatus of the present invention may include a reaction chamber, which may include an optional first reactant, and a reservoir having a second reactant. The first and second reactants can be a metal hydride, e.g., sodium borohydride, and water. Both reactants can be in gaseous, liquid, aqueous or solid form. Preferably, the first reactant stored in the reaction chamber is a solid metal hydride or metal borohydride, and the second reactant is water optionally mixed with additives and catalysts. One of the reactants may include methyl clathrates, which essentially include methanol enclosed or trapped inside other compounds. Water and metal hydride of the present invention react to produce hydrogen gas, which can be consumed by a fuel cell to produce electricity. Other suitable reactants or reagents are discussed below and are disclosed in the '540 application, previously incorporated above.

Additionally, the gas-generating apparatus can include a device or system that is capable of controlling the transport of a second reactant from the reservoir to the reaction chamber. The operating conditions inside the reaction chamber and/or the reservoir, preferably a pressure inside the reaction chamber, are capable of controlling the transport of the second reactant in the reservoir to the reaction chamber. For example, the second reactant in the reservoir can be introduced into the reaction chamber when the pressure inside the reaction chamber is less than a predetermined value, preferably less than the pressure in the reservoir, and, more preferably less than the pressure in the reservoir by a predetermined amount. It is preferable that the flow of the second reactant from the reservoir into the reaction chamber is self-regulated. Thus, when the reaction chamber reaches a predetermined pressure, preferably a predetermined pressure above the pressure in the reservoir, the flow of the second reactant from the reservoir into the reaction chamber can be stopped to stop the production of hydrogen gas. Similarly, when the pressure of the reaction chamber is reduced below the pressure of the reservoir, preferably below the pressure in the reservoir by a predetermined amount, the second reactant can flow from the reservoir into the reaction chamber. The second reactant in the reservoir can be introduced into the reaction chamber by any known method including, but not limited to, pumping, osmosis, capillary action, pressure differential, valve(s), or combinations thereof.

Referring to FIG. 1, a fuel supply system 10 is shown. System 10 includes a gas-generating apparatus 12 and is configured to be connected to a fuel cell (not shown) via a fuel conduit 16 and a valve 34. Preferably, fuel conduit 16 initiates within gas-generating apparatus 12, and valve 34 is disposed in a sidewall 21b thereof. Fuel conduit 16 is preferably a flexible tube having a total length that is slightly shorter than the length of gas-generating apparatus 12.

Within its sidewalls, gas-generating apparatus 12 preferably includes three distinct chambers: a fluid fuel component reservoir 44, a reaction chamber 18, and a void 45, with reaction chamber 18 sealingly but slidably disposed between reservoir 44 and void 45. Reservoir 44 is preferably a space formed between a sidewall 21a and a first sidewall 20a of reaction chamber 18. Reservoir 44 may also, however, include a bladder or similar fluid container. A fluid fuel component 22, preferably water and/or an additive/catalyst, resides within reservoir 44. Additional appropriate fluid fuel components and additives are further discussed herein. Although fluid fuel component 22 may be pressurized, preferably it is unpressurized. Void 45 is preferably an empty space on the opposite side of reaction chamber 18. Suitable additives/catalysts to the fuels or reactants include, but are not limited to, anti-freezing agents (e.g., methanol, ethanol, propanol and other alcohols), catalysts (e.g., cobalt chloride and other known catalysts), pH adjusting agents (e.g., acids such as sulfuric acid and other common acids).

Reaction chamber 18 preferably includes four sidewalls 20a-d made of a fluid impenetrable material, such as stainless steel or plastic. Reaction chamber 18 is sealed within the apparatus sidewalls by deformable members 38, which may be O-rings or gaskets. Reaction chamber 18 is attached to rear apparatus sidewall 21b by a biasing spring 30. Biasing spring 30, which may be any appropriate spring known in the art, provides a force that biases reaction chamber 18 toward reservoir 44. Spring 30 can be replaced by a pressurized gas or liquid, such as butane, propane or iso-propane, and void 45 may be opened to ambient when spring 30 is used to minimize the build-up of a partial vacuum.

Disposed within reaction chamber 18 is a solid fuel component 24. Solid fuel component 24 is preferably a tablet of $NaBH_4$. However, granules, grains, or other forms of solid material are also appropriate. Additional appropriate solid fuel components are further discussed herein. Fillers, additives and other agents and chemicals can be added to solid fuel $NaBH_4$ to improve its contact with the liquid reactant.

A connection point 17 for fuel conduit 16 is formed in rear sidewall 20c of reaction chamber 18. Connection point 17 may simply be a hole through rear sidewall 20c, preferably located at or near the top thereof. In such a case, fuel conduit 16 is preferably fixedly attached to or within connection point 17, such as with an adhesive. However, connection point 17 may also include a nozzle onto which fuel conduit 16 may be press fit and then optionally fixed with an adhesive or similar material. Also, optionally, a gas-permeable, liquid impermeable membrane 32 may be affixed over the reaction chamber-facing side of connection point 17. Membrane 32 prevents liquids or byproducts from being transferred to the fuel cell via fuel conduit 16. Fillers or foam can be used in combination with membrane 32 to retain liquids or byproducts and to reduce clogging. Membrane 32 may be formed from any liquid impermeable, gas permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Gas permeable member 30 may also comprise a gas permeable/liquid impermeable membrane covering a porous member. Examples of such membrane are CELGARD® and GORE-TEX®. Other gas permeable, liquid impermeable members usable in the present invention include, but are not limited to, SURBENT® Polyvinylidene Fluoride (PVDF) having a porous size of from about 0.1 μm to about 0.45 μm, available from Millipore Corporation. The pore size of SURBENT® PVDF regulates the amount of water exiting the system. Materials such as electronic vent type material having 0.2 μm hydro, available from W. L. Gore & Associates, Inc., may also be used in the present invention. Additionally, 0.25 inch diameter rods having a pore size of about 10 μm or 2 inch diameter discs with a thickness of about 0.3 μm available from GenPore, and sintered and/or ceramic porous material having a pore size of less than about 10 μm available from Applied Porous Technologies Inc. are also usable in the present invention. Furthermore, nanograss materials, from Bell Labs, are also usable to filter the liquid. Nanograss controls the behavior of tiny liquid droplets by applying electrical charges to specially engineered silicon surfaces that resemble blades of grass. Additionally, or alternatively, the gas permeable, liquid impermeable materials disclosed in commonly owned, co-pending U.S. patent application Ser. No. 10/356,793 are also usable in the present invention, all of which are incorporated by reference herein in their entireties. Such a membrane 32 may be used in any of the embodiments discussed herein.

Figure 2:
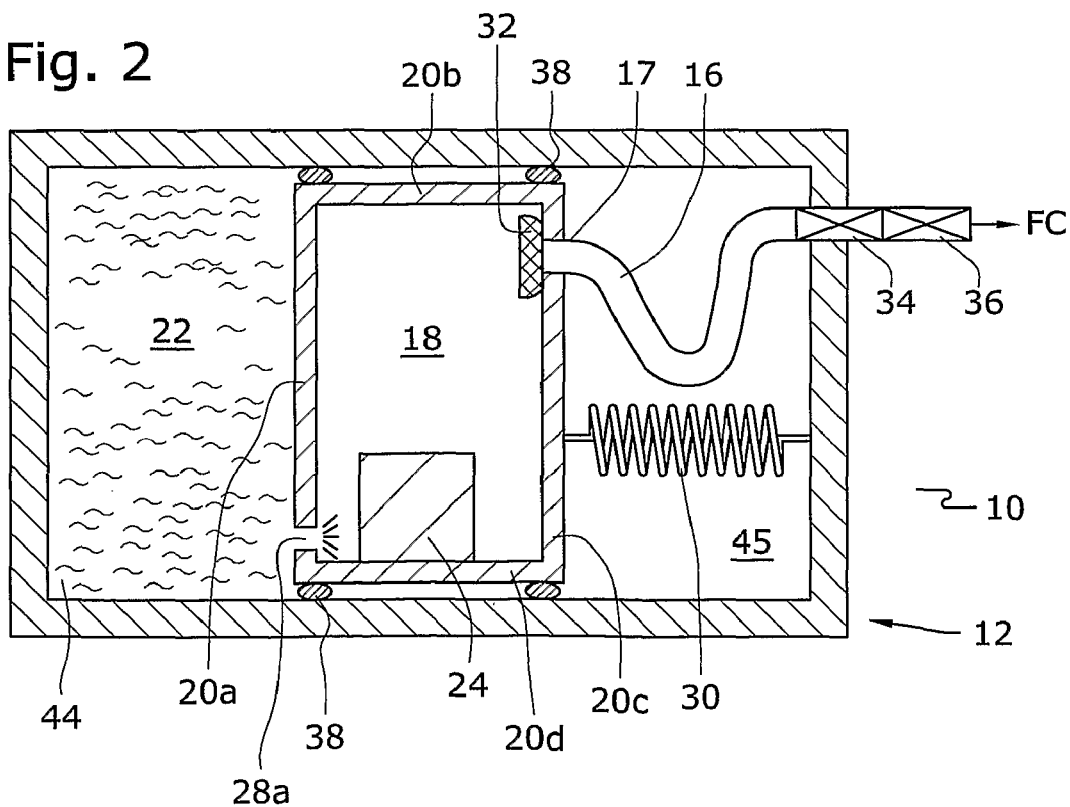
FIG. 2 is a sectional schematic view of an alternate embodiment of the gas-generating apparatus of FIG. 1.

A fluid introduction valve 26 is disposed in an opposite reaction chamber sidewall 20a. Fluid introduction valve 26, which is preferably a check valve, controls the communication of fluid fuel component 22 from reservoir 44 into reaction chamber 18. Valve 26 may be any pressure-opened, one-way valve known in the art, such as a check valve or a valve having a pressure responsive diaphragm, which opens when a threshold pressure is reached. Within reaction chamber 18, valve 26 preferably includes a nozzle 28 to disperse the fluid fuel component 22 within reaction chamber 18. As will be recognized by those in the art, valve 26 may be optionally omitted, as shown in FIG. 2. In that embodiment, which is the same in all other respects to the embodiment shown in FIG. 1, a small diameter hole 28a acts as the pressure-triggered nozzle for dispersing fluid fuel component 22 into reaction chamber 18. Hole 28a is preferably located at the bottom of chamber 18 to minimize the migration of gas into reservoir 44. Alternatively, solid fuel component 24 can be positioned adjacent to hole 28a to minimize the migration of gas into reservoir 44.

When hydrogen gas is needed by the fuel cell, on/off or shut-off valve 36, as shown in FIG. 1, is opened. On/off valve 36 can be any valve known in the art, including but not limited to, solenoid valve, check valve, etc., and can be opened manually by the user or by the controller controlling the fuel cell. To generate gas to be used as fuel for the fuel cell, fluid fuel component 22 is transferred into reaction chamber 18 to react with solid fuel component 24. Gas-generating apparatus 12 does this automatically. Spring 30 pushes reaction chamber 18 toward reservoir 44 with a constant force F. Force F, combined with the hydrostatic pressure HP within reservoir 44, create a total reservoir pressure $P_{22}$ on the reservoir 44 side of valve 26. While on/off valve 36 is opened, the reaction chamber pressure $P_{18}$ within reaction chamber 18 is dynamically cycled from high to low as gas is created and then transferred through fuel conduit 16. When total reservoir pressure $P_{22}$ is greater than reaction chamber pressure $P_{18}$, valve 26 opens and fluid fuel component 22 flows into reaction chamber 18, which moves toward sidewall 21a. When the difference between total reservoir pressure $P_{22}$ and reaction chamber pressure $P_{18}$ falls below the triggering point for valve 26, valve 26 closes and reaction chamber 18 stops moving while gas accumulates therewithin. When reaction chamber pressure $P_{18}$ reaches a triggering pressure TP, fuel valve 34 opens, and fuel gas begins to flow out of reaction chamber 18. When sufficient fuel gas has been transferred out of reaction chamber 18, fluid valve 26 opens and additional fluid fuel component 22 enters reaction chamber 18 while gas is still being transferred out of reaction chamber 18 through fuel conduit 16. Eventually, reaction chamber pressure $P_{18}$ falls below triggering pressure TP to hold open fuel transfer valve 34. This allows fuel gas to accumulate within reaction chamber 18 to eventually close fluid transfer valve 26. This cycle is summarized below in Table 1.

TABLE 1

Pressure Cycle of Gas-Generating Apparatus When Valve 36 Opens

| Pressure Balance | Condition of Fluid Transfer Valve 26 | Condition of Fuel Transfer Valve 34 | Movement of Reaction Chamber 18 |
|---|---|---|---|
| $P_{22} > P_{18}$ | OPEN | OPEN | Toward Reservoir 22 |
| $P_{22} = P_{18}$ | CLOSED | CLOSED | None |
| $P_{22} \leq P_{18}$ | CLOSED | OPEN | None |
| $P_{22} > P_{18}$ | OPEN | OPEN | Toward Reservoir 22 |
| $P_{22} > P_{18}$ | OPEN | CLOSED | Toward Reservoir 22 |

Figure 3:
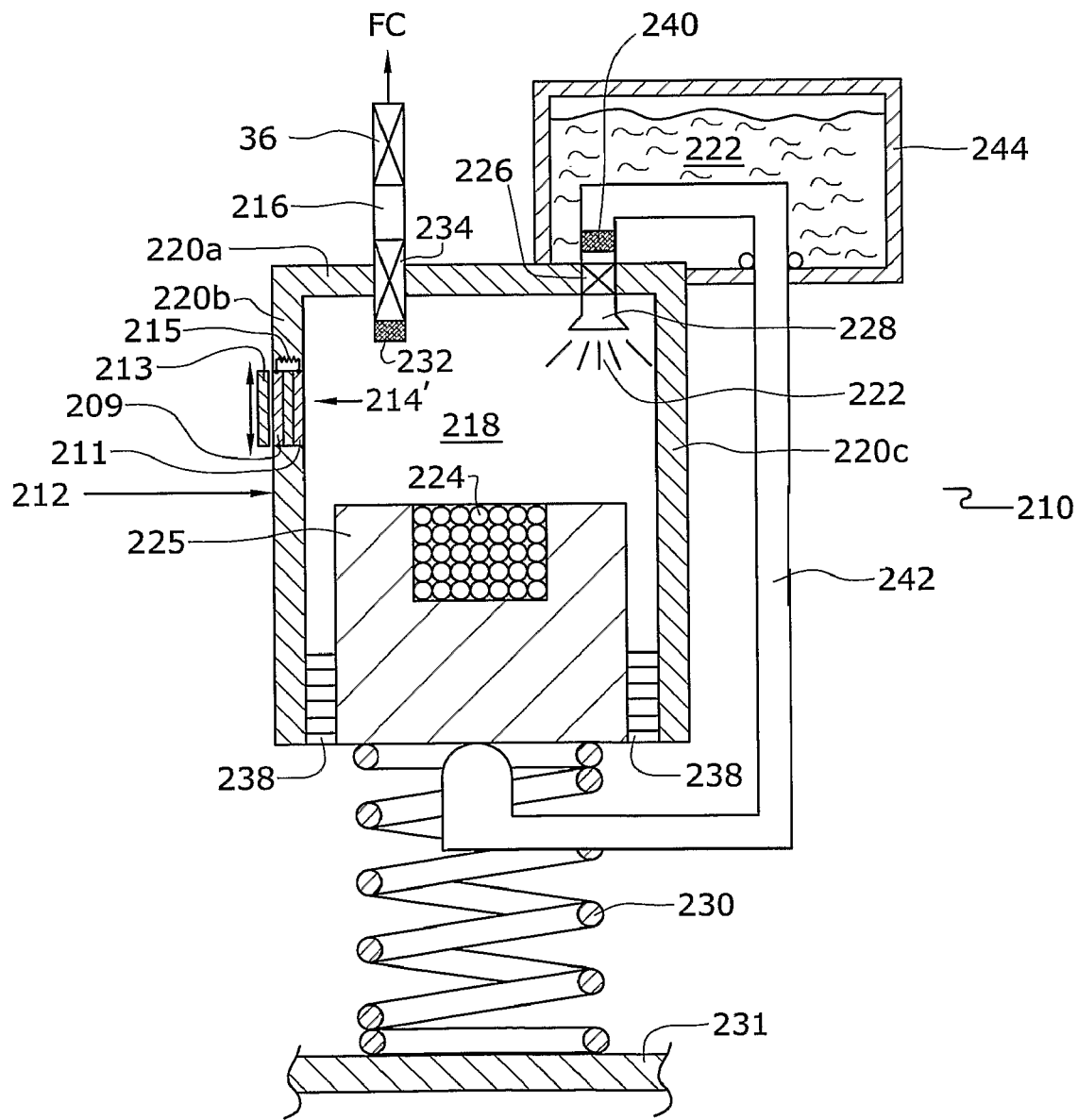
FIG. 3 is a sectional schematic view of an alternate embodiment of a gas-generating apparatus according to the present invention.

FIG. 3 shows another embodiment of a fuel supply 210 including a gas-generating apparatus 212 where a fluid fuel component 222, similar to fluid fuel component 22 discussed above, is held in a reservoir 244 and transferred to a reaction chamber 218 containing a solid fuel component 224, similar to solid fuel component 24 discussed above. In this embodiment, reaction chamber 218 is formed from three sidewalls 220a-c. A bottom of reaction chamber 218 is sealed by a solid fuel carrier 225, which fits snugly and slidably between sidewalls 220b, 220c. Solid fuel carrier 225 is sealed in the opening by deformable members 238, which may be O-rings, gaskets or the like. Alternatively, solid fuel carrier 225 may itself be formed from an appropriately sealing deformable material, although carrier 225 is preferably made from a rigid material such as stainless steel or plastic. Carrier 225 includes an open container portion filled with solid fuel component 224, such as a tablet or granules of sodium borohydride.

Carrier 225 is biased into reaction chamber 218 by a biasing spring 230, which may be any type of spring known in the art. Biasing spring 230 is fixedly mounted onto a base 231, such as a sidewall of fuel supply 210, fuel cell, or other similar platform, and biasing spring 230 provides a constant force on carrier 225.

Fixedly attached to a bottom of carrier 225 is a crank arm 242. Crank arm 242 extends from the bottom of carrier 225, through a sealed opening in reservoir 244, and terminates as a stopper 240 positioned over or a fluid transfer hole 226 formed at the interface of reservoir 244 and reaction chamber 218. While crank arm 242 may be made of any rigid material that will not react with fluid fuel component 222, stopper 240 preferably includes an exterior coating of a deformable material, such as rubber or silicone, capable of sealing hole 226.

Through top sidewall 220a, fluid transfer hole 226 connects fluid fuel component reservoir 244 with reaction chamber 218. Similar to the embodiment discussed above with respect to FIG. 1, the end of fluid transfer hole 226 facing into reaction chamber 218 preferably forms a nozzle 228 so that any fluid fuel component passing through fluid transfer hole 226 is dispersed within reaction chamber 218. Also disposed in top sidewall 220a is a fuel transfer valve 234 that connects reaction chamber to a fuel conduit 216. Similar to valve 34 discussed above, fuel transfer valve 234 is preferably a pressure-triggered valve such as a check valve, and is optionally covered by a gas-permeable, liquid impermeable membrane 232, which may be any such membrane known in the art.

Similar to the embodiment discussed above with respect to FIG. 1, the operation of gas-generating apparatus 212 is preferably automatically controlled or cycled by the balance between the pressures and forces within apparatus 212. The reaction chamber pressure $P_{218}$ changes dynamically due to the production of fuel gas within reaction chamber 218 and the transfer of that fuel gas to a fuel cell (not shown) through fuel transfer valve 234. Spring 230 provides a constant F upward on carrier 225. When the force from $P_{218}$ is greater than F, carrier 225 is pushed downward, thereby moving crank arm 242 downward as well. Eventually, carrier 225 will move far enough due to the high $P_{218}$ to push stopper 240 into place, thereby shutting off the flow of fluid fuel component into reaction chamber 218. Fuel transfer valve 234 is opened only when $P_{218}$ is greater than a triggering pressure TP.

Preferably, reaction chamber 218 is charged with fuel or inert gas so that the initial state of carrier 225 is in a downward position and spring 30 is compressed. Alternately, the user may manually unseal stopper 240 by known mechanical means (e.g., pull tabs, slides, etc.), or stopper 240 is automatically removed when attached to the fuel cell, so that no initial pressure is necessary.

In an embodiment, fluid fuel component 222 is stored in a bladder (not shown) and reservoir 244 is pressurized by compressed gas, liquefied gas, compressed foam or loaded spring, so that fluid component 222 can exit reservoir 244 when reservoir 244 is positioned in any orientation.

Also, preferably, $P_{218}$ is higher than the TP for valve 234. When connected to a fuel cell, gas is transferred out of reaction chamber 218, thereby reducing $P_{218}$. Eventually, sufficient gas is transferred such that F from spring 230 overcomes the force from $P_{218}$ and pushes carrier 225 upward, thereby unplugging stopper 240 from fluid transfer hole 226 via crank arm 242. Fluid 222 is then sprayed into reaction chamber 218 through nozzle 228. However, gas continues to be transferred out of reaction chamber 218 through valve 234 until $P_{218}$ falls below the TP. When the valve closes, the pressure in reaction chamber 218 again builds until the force from $P_{218}$ overcomes F from spring 230, and stopper 240 again plugs fluid transfer hole 226. This cycle is summarized in Table 2.

TABLE 2

Pressure Cycle for Gas-Generating Apparatus When Valve 36 is Opened

| Force Balance | Condition of Fluid Transfer Hole 226 | Condition of Fuel Transfer Valve 234 | Movement of Carrier 225 |
|---|---|---|---|
| $F < P_{218}$ | CLOSED | OPEN | None |
| $F = P_{218}$ | CLOSED | OPEN | None |
| $F > P_{218}$ | OPEN | OPEN | None |
| $F > P_{218}$ | OPEN | OPEN | Toward Reaction Chamber 218 |
| $F > P_{218}$ | OPEN | CLOSED | Toward Reaction Chamber 218 |
| $F < P_{218}$ | OPEN | CLOSED | Toward Base 231 |

Another device to control the pressure of reaction chamber 218 is to place a secondary fuel cell 214' on a sidewall 220b, as shown in FIG. 3. Secondary fuel cell 214' consumes excess hydrogen to minimize pressure $P_{218}$ when shut-off valve 236 is closed. As shown, secondary fuel cell 214' is positioned on sidewall 220b with the anode side 211 facing the reaction chamber 218 and in contact with the hydrogen gas therein and with the cathode side 209 facing the ambient air and in contact with oxygen. Preferably, a movable cover gate 213 is provided to cover the cathode side when the gas-generating apparatus is in operation to prevent air from reaching fuel cell 214' so that hydrogen is not wasted in consumption by secondary fuel cell 214' when desired by the main fuel cell (not shown). When the user or controller opens valve 236, gate 213 is moved to cover secondary fuel cell 214'. When the user or controller closes valve 236 (or when pressure $P_{218}$ exceeds a threshold level) gate 213 is moved to allow air to contact the cathode side to consume excess hydrogen. An electrical-energy consuming device, such as a resistor 215, light emitting diode, or similar electricity consuming and/or dissipating circuit, is provided as shown schematically to consume the electricity produced by fuel cell 214'. Secondary fuel cell 214' and cover 213 can be used with any of the embodiments of the present invention.

Figure 4:
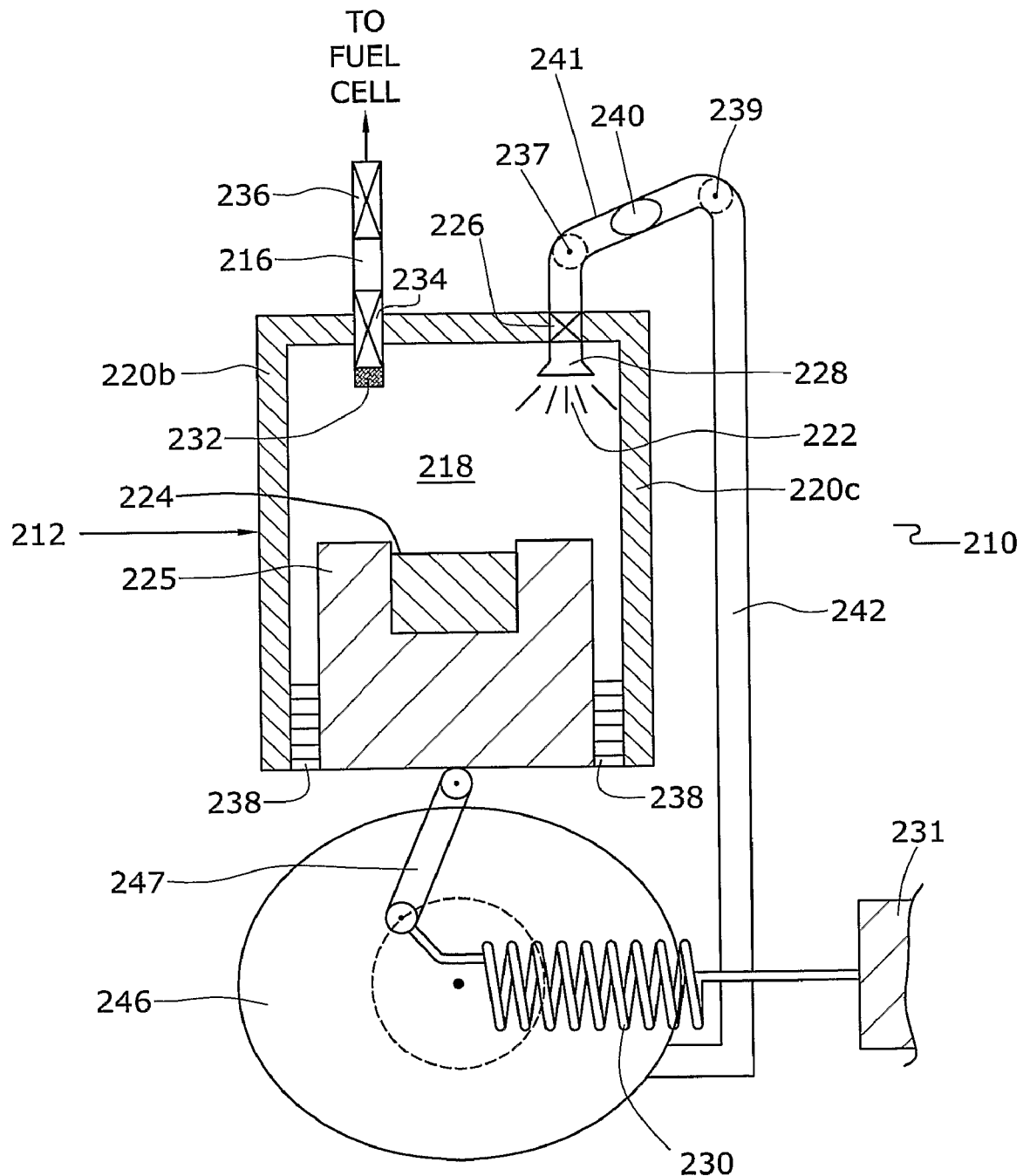
FIG. 4 is a sectional schematic view of an alternate embodiment of the gas-generating apparatus of FIG. 3.

FIG. 4 shows a similar gas-generating apparatus 212 to the one shown and discussed above with respect to FIG. 3. In this embodiment, however, instead of a crank arm connected directly to a bottom of carrier 225, a shaft 247 is hingedly attached to the bottom of carrier 225 and to a crank wheel 246. A biasing spring 230 is fixedly attached to crank wheel 246 on one end and to a solid base 231 on the other. Biasing spring 230 provides a constant force F that tends to push crank wheel 246 in a clockwise direction.

A crank arm 242 is fixedly attached to crank wheel 246 at a lower end of crank wheel 246. An upper end of crank arm 242 is hingedly attached to a tube 241 at an attachment point 239 containing a slidable stopper 240. The other end of tube 241 is hingedly attached to an access point 237 above fluid transfer hole 226. Stopper 240 may be any material or shape, as long as stopper 240 can move easily within tube 241 and plug hole 226.

As crank wheel 246 turns, crank arm 242 moves in the vertical plane. When crank wheel 246 is turned clockwise, crank arm 242 moves down toward base 231. This downward motion of crank arm 242 pulls tube 241 so that attachment point 239 is positioned below access point 237. When tube 241 is oriented in this manner, stopper 240 slides toward attachment point 239, thereby unplugging hole 226. When crank wheel 246 is turned in a counter-clockwise direction, crank arm 242 moves in an upward direction, away from base 231. Tube 241 is again tilted such that attachment point 239 is positioned above access point 237. When tube 241 is oriented in this manner, stopper 240 slides toward access point 237, thereby plugging hole 226.

As with the embodiment shown in FIG. 3, this process is preferably controlled automatically by the pressure and force balances within gas-generating apparatus 212. For example, reaction chamber 218 is preferably initially charged such that the force due to $P_{218}$ within reaction chamber 218 pushes downward on to carrier 225, far enough that crank arm 242 tilts tube 241 to such an extent that stopper 240 slides toward access point 237 and plugs hole 226. Also, $P_{218}$ is above TP, so valve 234 opens when connected to the fuel cell and fuel gas flows out of reaction chamber 218. At this point, gas generation within reaction chamber 218 slows and eventually stops causing $P_{218}$ to decrease. $P_{218}$ eventually decreases to a point where the force from $P_{218}$ is no longer sufficient to overcome F, which causes crank wheel 246 to turn clockwise. This motion tilts tube 241 via crank arm 242 so that stopper 240 slides toward attachment point 239, thereby unplugging fluid transfer hole 226, which allows fluid fuel component 222 to flow into reaction chamber 218 through nozzle 228. Gas is again generated within reaction chamber 218. Gas is removed from reaction chamber 218 through valve 234 at a rate that is preferably slower than the rate at which gas continues to be generated within reaction chamber 218, so that $P_{218}$ continues to build. If $P_{218}$ falls below TP, valve 234 closes, which allows gas to accumulate within reaction chamber 218. This pressure and force cycle is summarized in Table 3.

TABLE 3

Pressure Cycle of Gas-Generating Apparatus When Valve 36 is Opened

| Force Balance | Condition of Fluid Transfer Hole 226 | Condition of Fuel Transfer Valve 234 | Rotation of Wheel 246 |
|---|---|---|---|
| $F < P_{218}$ | CLOSED | OPEN | None |
| $F = P_{218}$ | CLOSED | OPEN | None |
| $F > P_{218}$ | OPEN | OPEN | CCW |
| $F > P_{218}$ | OPEN | CLOSED | CCW |
| $F < P_{218}$ | OPEN | CLOSED | CW |

Figure 5:
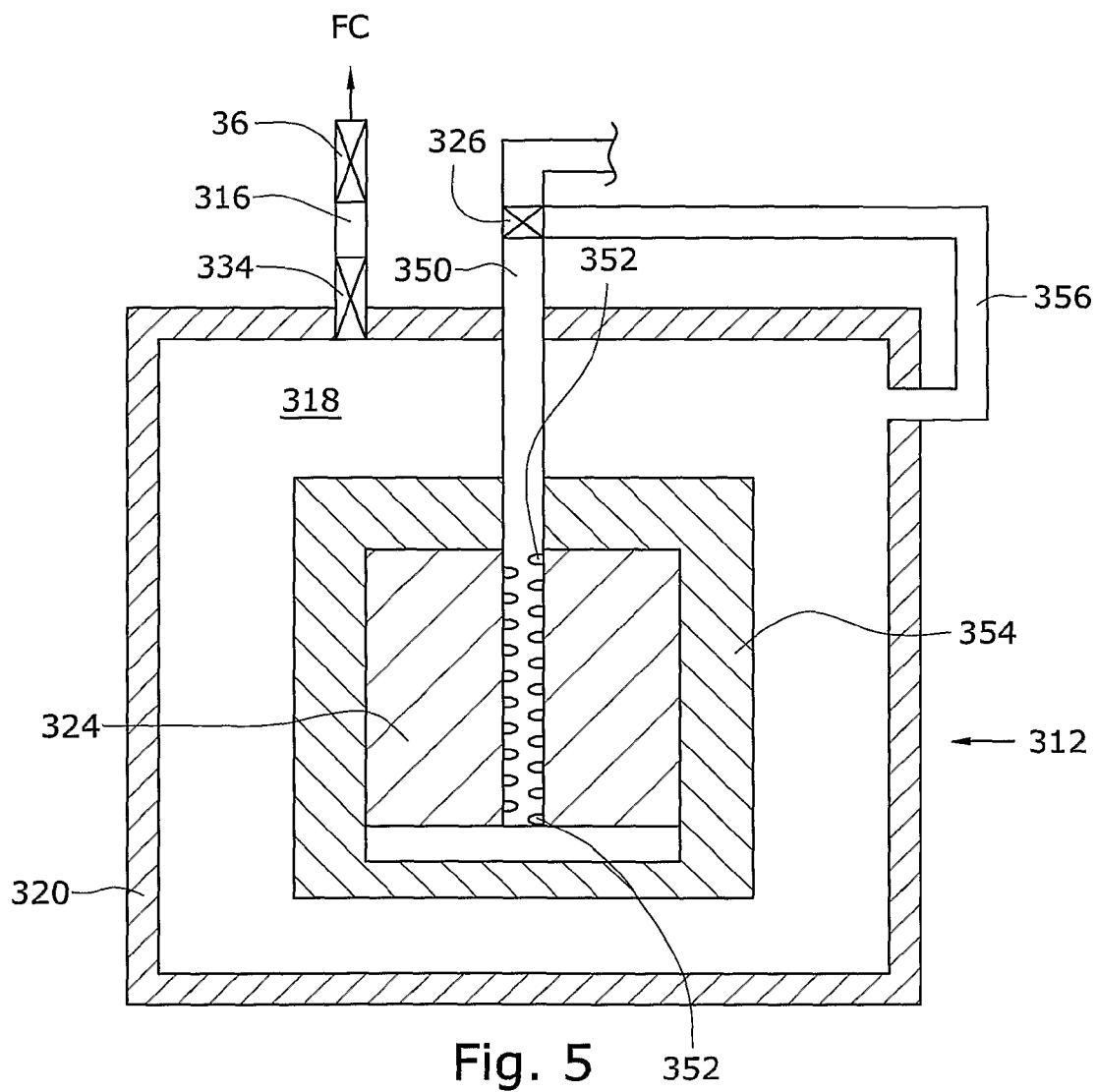
FIG. 5 is a sectional schematic view of yet another gas-generating apparatus according to the present invention utilizing a flow pipe covered by an absorbent roll.

FIG. 5 shows yet another gas-generating apparatus 312 having a reaction chamber 318 defined by sidewalls 320, similar to those described above with respect to FIGS. 1-4. A fuel transfer valve 334, such as a check valve, traverses one of the sidewalls 320 to allow fuel gas formed within reaction chamber 318 to pass therethrough and into a fuel conduit 316, similar to the fuel conduit described above with respect to FIGS. 3 and 4.

A fluid transfer tube 350 enters reaction chamber 318 through a sidewall, preferably an upper sidewall. Fluid transfer tube is attached at one end to a reservoir that holds a fluid fuel component (not shown). The fluid fuel component is preferably similar to the fluid fuel components described above.

Fluid transfer tube 350 extends into reaction chamber 318. Toward the free end of fluid transfer tube 350 several flow channel holes 352 are formed along the length of fluid transfer tube 350. Fluid fuel component is transferred through fluid transfer tube 350 so that the fluid fuel component can flow out of flow channel holes 352.

Figure 6:
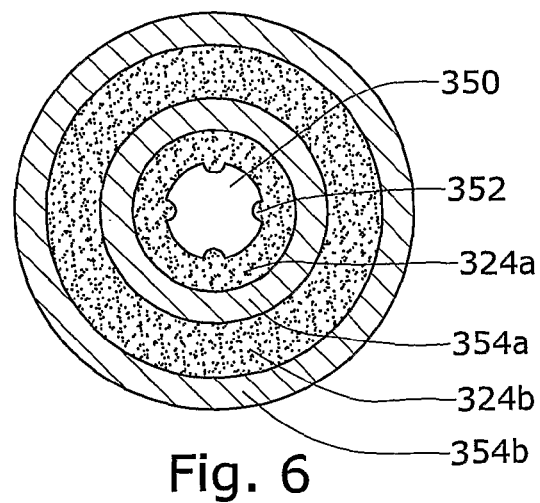
FIG. 6 is a cross-sectional schematic view of an alternate embodiment of the absorbent roll of the gas generating apparatus shown in FIG. 5.

Covering flow channel holes 352 is a covering formed of a solid fuel component 324 and a material 354 that quickly absorbs the fluid fuel component and pulls it through solid fuel component 324. Preferably, solid fuel component 324 is in granular form so that the fluid fuel component can be readily passed therethrough. Preferably, material 354 is capable of absorbing liquid, but which allows gas to pass through the material. One example of such a material is paper fluff containing sodium polyacrylate crystals; such a material is commonly used in diapers. Other examples include, but are not limited to, fillers and foams. In one embodiment, shown in FIG. 6, several-layers of solid fuel component 324a, 324b and material 354a, 354b are wound around fluid transfer tube 350. However, as few as one layer may be used. As the fluid fuel component is pulled through the solid fuel component, fuel gas is formed and passes through material 354 and into reaction chamber 318. Further, fluid may contact a filler or foam first, and then be transferred to the solid fuel through capillary action.

Sodium polyacrylate crystals form a gel with water and the water gel can react with a metal hydride, as shown in commonly owned, co-pending United States patent application entitled "Fuel Compositions for Fuel Cells and Gas-Generators Utilizing Same" bearing Ser. No. 60/782,632, and filed on Mar. 15, 2006. The '632 application is incorporated herein by reference in its entirety.

A fluid control valve 326 is preferably disposed within fluid transfer tube 350 to control the flow of the fluid fuel component through to flow channels 352. Fluid control valve 326 is preferably a pressure-triggered valve that is opened and closed in response to pressure $P_{318}$ in reaction chamber 318. A pressure transfer tube 356 allows for the exposure of a small portion of the fuel gas formed within reaction chamber 318 to fluid control valve. When $P_{318}$ is higher than the triggering pressure for fluid control valve 326, fluid control valve 326 closes and shuts off the flow of fluid fuel component through fluid transfer tube 350. When the $P_{318}$ falls below the triggering pressure for fluid control valve 326, fluid control valve 326 opens and allows more fluid fuel component into fluid transfer tube 350.

Similarly, the operation of fuel transfer valve 334 is also controlled by $P_{318}$. When $P_{318}$ is higher than a triggering pressure TP for fuel transfer valve 334, then fuel transfer valve 334 opens to allow fuel gas to flow through fuel conduit 316 and into the fuel cell. When $P_{318}$ falls below the triggering pressure for fuel transfer valve 334, then fuel transfer valve 334 closes, which allows gas pressure to build within reaction chamber. As with the embodiments discussed above, reaction chamber is preferably charged upon manufacture so that the production of gas can be initiated.

FIGS. 7 and 8 show yet another embodiment of a gas-generating apparatus 412 of a fuel supply 410 is shown. In this embodiment a reaction chamber 418 is defined by an expandable bladder 458. Expandable bladder 458 may be made of any type of material capable of expanding and contracting without the application of external forces. For example, expandable bladder 458 may be a balloon-like structure made of rubber or latex. Alternatively, expandable bladder 458 may be made from a plastic material that may be heat set to return to its original configuration when emptied, such as PET.

Expandable bladder 458 is preferably suspended near the center of gas-generating apparatus 412 on a support 460. Expandable bladder 458 also sealingly surrounds a cage 462 filled with a solid fuel component such as sodium borohydride that extends from support 460. Preferably, the solid fuel component is granular, although a solid tablet or slug may also be used. Cage 462 may be made of any material inert to the solid fuel component and a liquid fuel component 422 that is also disposed within expandable bladder 458. For example, cage 462 may be made of stainless steel or plastic. Holes 464 are formed in cage 462 so that liquid fuel component 422 can come into contact with the solid fuel component. Liquid fuel component 422 is similar to the liquid fuel components discussed in the above embodiments.

A second end of expandable bladder 458 is attached to a fuel conduit 416, which is configured to transfer fuel gas formed within reaction chamber 418 to a fuel cell. Fuel conduit 416 is similar to those fuel conduits discussed above with respect to the embodiments shown in FIGS. 3-6. A fuel transfer valve 434, preferably a pressure triggered valve such as a check valve, is configured to control the outflow of fuel gas from reaction chamber 418.

In operation, expandable bladder 458 is initially in a collapsed configuration, such as is shown in FIG. 7. When collapsed, liquid fuel component 422 is in contact with cage 462. As such, liquid fuel component 422 can flow through holes 464 to react with the solid fuel component. Fuel gas such as hydrogen is produced. As fuel gas accumulates within reaction chamber 418, expandable bladder 458 expands. When the RCP within reaction chamber 418 exceeds a triggering pressure TP for fuel transfer valve 434, fuel transfer valve 434 opens to allow the transfer of fuel gas from reaction chamber 418 to the fuel cell. When expandable bladder 458 reaches a critical size, such as is shown in FIG. 8, all of liquid fuel component 422 collects in the bottom of expandable bladder 458 and is no longer in contact with the solid fuel component within cage 462. As such, additional reaction between liquid fuel component 422 and solid fuel component cannot occur until enough gas has been transferred out of reaction chamber 418 to the fuel cell. An optional one-way relief valve 430 may be included to prevent over pressurization of expandable bladder 458, such as by venting the fuel gas to the atmosphere. As will be recognized by those in the art, gas-generating apparatus 412 works in any orientation.

Figure 9:
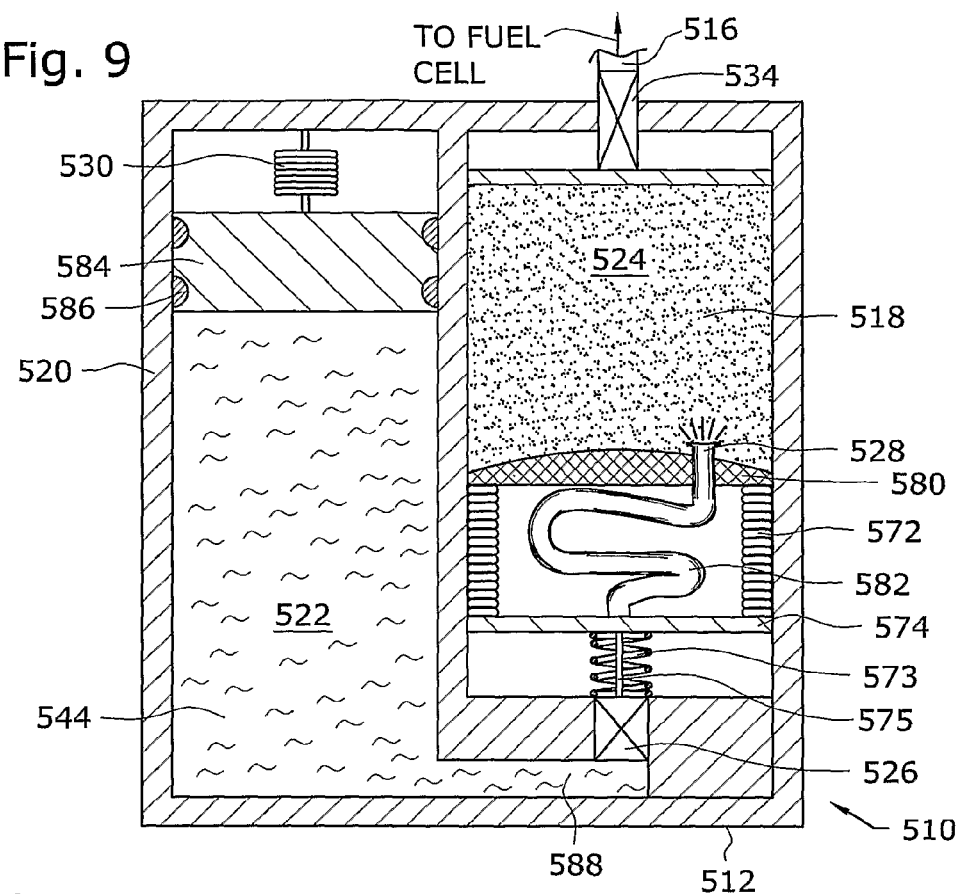
FIG. 9 is a sectional schematic view of another alternate embodiment of a gas-generating apparatus according to the present invention having a solution reservoir and a separate reaction chamber including a screen element.
Figure 10:
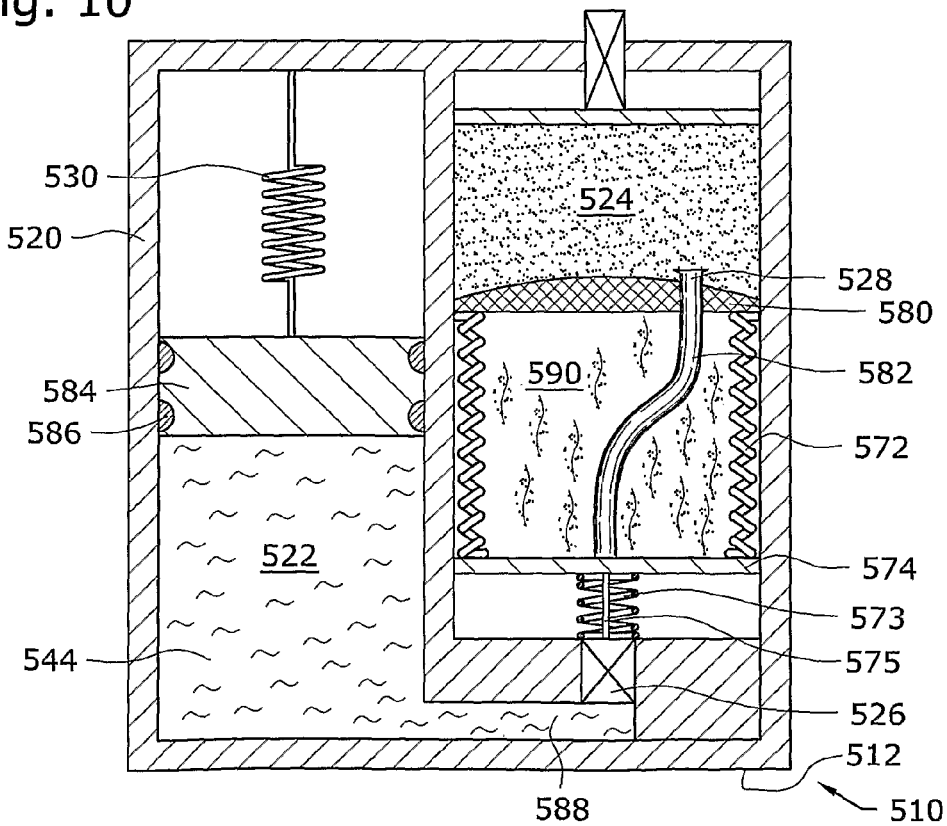
FIG. 10 is a sectional schematic view of the gas generating apparatus shown in FIG. 9 where the screen element is advanced within the reaction chamber.

FIGS. 9 and 10 show yet another embodiment of a gas-generating apparatus 512 of a fuel supply 510 adapted to be connected to a fuel cell (not shown) via a fuel conduit 516. Gas-generating apparatus 512 includes two chambers formed within sidewalls 520, a pressurized liquid fuel component chamber 544 and a reaction chamber 518. Sidewalls 520 are preferably formed of a material inert to a liquid fuel component 522, such as water or water with additives, contained within pressurized liquid fuel component chamber 544 and a solid fuel component 524, such as sodium borohydride, contained within reaction chamber 518. A fluid transfer conduit 588 connects pressurized liquid fuel component chamber 544 and reaction chamber 518. As with the embodiments discussed above, a fuel transfer valve 534, preferably a pressure-triggered valve such as a check valve, and an on/off valve 36 (not shown) downstream of valve 534 allow for the transfer of fuel from reaction chamber 518 to fuel conduit 516 and on to a fuel cell.

A spring-biased piston 584 is sealingly and slidingly disposed, initially, at or near the top of pressurized liquid fuel component chamber 544. Preferably, piston 584 is sealed with a lubricating sealing material 586, such as petroleum jelly, although other sealing components such as O-rings or gaskets may be used. A biasing spring 530 provides a continuous force F on piston 584 so that liquid fuel component 522 is constantly being forced toward reaction chamber 518. Similar to the discussion above, spring 530 can be replaced by a pressurized material, such as liquid/gaseous hydrocarbon, e.g., butane, propane or iso-propane.

A flexible fluid tube 582 is fluidly connected to fluid transfer conduit 588, discussed below, and terminates in a nozzle or opening 528 within reaction chamber 518. Fluid fuel component 522 selectively passes through flexible fluid tube 582 into reaction chamber 518. Flexible fluid tube 582 passes through or is in contact with a mesh piston 580. Mesh piston 580 is biased toward fuel component 524 by a biasing spring 572. Biasing spring 572 provides a continuous force on mesh piston 580 to bias it into fuel component 524 toward fuel conduit 516. Mesh piston 580 is kept in contact with solid fuel component 524, which is preferably formed of granules that are too large to pass through the mesh of piston 580, by spring 572. However, as fluid fuel component 522 flows into reaction chamber 518 through nozzle 528 and reacts with solid fuel 524, as shown in FIG. 10 both fuel gas and a slurry 590, e.g., aqueous borate, are formed. Slurry 590 can flow through the mesh of piston 580 to accumulate underneath mesh piston 580. Spring 572 then continually pushes mesh piston 580 into the un-reacted portion solid fuel component 524. As such, the fluid fuel component flowing out of nozzle 528 is continually in contact with fresh solid fuel component 524 that is relatively free from the byproducts.

Similar to the embodiments discussed above, gas generating apparatus 512 is also self-regulated. Diaphragm 574, an optional spring 573, and valve 526, positioned below mesh piston 580, are exposed to the pressure $P_{518}$ within reaction chamber 518. A fluid conduit 575 is formed through diaphragm 574 and fluidly connects fluid conduit 588 to flexible tube 582. As pressure builds within reaction chamber 518, a triggering pressure, TP, of diaphragm 574 is eventually reached. When the triggering pressure of diaphragm 574 is reached, diaphragm 514 deforms to close valve 526 (not shown), thereby cutting off the flow of fluid fuel component into reaction chamber 518. Fuel gas flows out of fuel transfer valve 534 until the $P_{518}$ decreases to below TP, where diaphragm 574 opens again to once again initiate the production of fuel gas by introducing additional liquid fuel component 522 into reaction chamber 518. Spring 573 assists diaphragm 574 in returning to the open position. Valve 526 can be any valve that can open and close as diaphragm 574 reacts to $P_{518}$, e.g., check valve.

Figure 11:
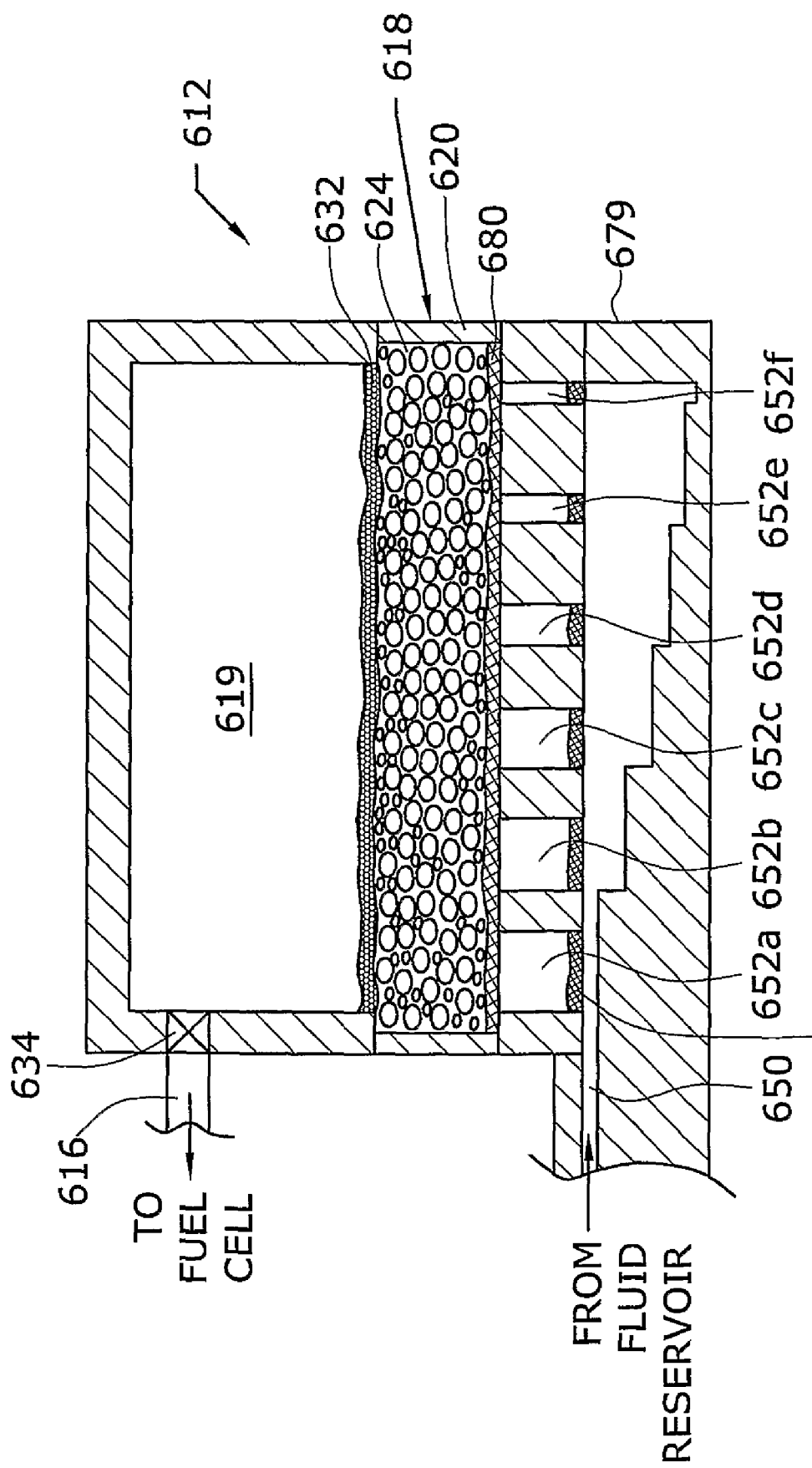
FIG. 11 is a sectional schematic view of another alternate embodiment of a gas-generating apparatus according to the present invention having a manifold with a plurality of flow channels of varying diameter.

FIG. 11 shows yet another embodiment of a gas-generating apparatus 612 adapted to be connected to a fuel cell (not shown) via a fuel conduit 616. In this embodiment, a reaction chamber 618 contains a quantity of a solid fuel component 624, which is preferably in granular or powdered form. Reaction chamber 618 includes two opposing sidewalls 620, which are made of a solid, non-reactive material similar to sidewalls 20 as discussed above. However, a bottom 680 of reaction chamber 618 is preferably made of a porous non-reactive material, such as a mesh or a sheet of material with holes disposed therethrough. Fiberglass is one of many materials appropriate for use as bottom 680. The pores of bottom 680 are dimensioned such that the individual grains of solid fuel component 624 cannot pass therethrough.

A top 632 of reaction chamber 618 is preferably formed of a gas-permeable, liquid impermeable membrane, such as membrane 32 as described above with respect to FIG. 1. Examples of an appropriate membrane include CELGARD® and GORE-TEX®. A fuel gas reservoir 619 is positioned adjacent to top membrane 632 to receive therethrough the fuel gas produced within reaction chamber 618. A valve 634, such as a check valve, controls the outflow of fuel gas from fuel gas reservoir 619 to fuel conduit 616. Valve 634 may be any type of valve known in the art and is similar in design and function to valve 34 as described above with respect FIG. 1.

A manifold 679 is positioned adjacent to bottom 680. Preferably, several flow channels 652a-f are formed in manifold 679. As will be recognized by those in the art, the number of flow channels will vary widely depending on factors including the type of fuel, the type of fuel cell, and the device being driven by the fuel cell. Preferably, the number of flow channels ranges from 2 to about 100, and more preferably, from about 50 to about 75.

Flow channels 652a-f are fluidly connected to a feeder tube 650 through which a fluid fuel component (not shown) is provided from a reservoir (not shown). The initial flow of fluid through feeder tube 650 is preferably controlled by a controller (not shown) which signals a need for additional fuel and opens a valve (not shown) disposed between the fluid reservoir and feeder tube 650. Alternatively, a user may initiate flow by triggering a switch to open such a valve. Manifold 679 is configured to allow only one flow channel 652 a-f to receive the fluid fuel component from feeder tube 650 at any given time so that different areas of the solid fuel component 624 are reacted successively. In other words, if the fluid fuel component is flowing through flow channel 652a, flow channels 652b-f contain no fluid fuel component so that the solid fuel component 624 disposed above the unused flow channels 652 b-f remains dry and unreacted.

This series use of flow channels 652a-f is preferably achieved in part by providing each flow channel with a diameter that is different from the other flow channels. Preferably, flow channel 652a has the largest diameter, with each successive flow channel having a slightly smaller diameter progressing in the direction of flow. In other words, the diameter of flow channel 652b is greater than the diameter of flow channel 652c, and so on. As in known in the art, fluid flows in the path of least resistance. As the narrower diameter of the next flow channel downstream is essentially constricting the flow of the fluid, the fluid tends to follow the path through the largest available channel. For example, if presented with a flow path through flow channel 652a or flow channel 652b, most of the fluid will flow through flow channel 652a.

This tendency of the fluid to flow through the largest available channel is optionally enhanced by configuring feeder tube 650 with a stepwise construction, where the diameter of feeder tube 650 increases slightly just prior to reaching the next successive flow channel 652. For example, as feeder tube 650 is relatively narrow in the vicinity of relatively wide flow channel 652a, the fluid in feeder tube 650 will tend to enter flow channel 652a instead of continuing to flow along feeder tube 650.

As the fluid fuel component flows into reaction chamber 618 through flow channel 652a, the fluid fuel component reacts with solid fuel 624. For example, if the solid fuel component 624 is sodium borohydride and the fluid fuel component is water or doped water, then hydrogen gas and a slurry of aqueous borate is produced. If the slurry is not removed from the mouth of flow channel 652a, the slurry tends to harden like concrete. This hardened slurry eventually entirely clogs flow channel 652a. As flow channel 652a is now blocked, the fluid in feeder tube 650 will flow to the next available path, flow channel 652b. While some of the fluid may flow past flow channel 652b, it is believed that this flow amount is insufficient to flow into any of the remaining flow channels 652c-f until flow channel 652b is also clogged with hardened slurry. This process continues until all flow channels 652a-f are clogged and/or all of solid fuel component 624 is consumed.

Optionally, a second mesh 681 is disposed at the inlet of each of flow channels 652a-f. Second mesh 681 has a very small pore size so that fluid can flow therethrough but any slurry that might escape reaction chamber 618 is captured so as not to contaminate the fluid fuel component or clog feeder tube 650. As will be recognized by those in the art, other hydraulic parameters of flow channels 652 may also be changed to manipulate the tendency of fluid to choose a particular flow path, such as the height of the flow channels, where each successive downstream channel is taller than the previous flow channel. Any combination of hydraulic parameters may be used.

Figure 12:
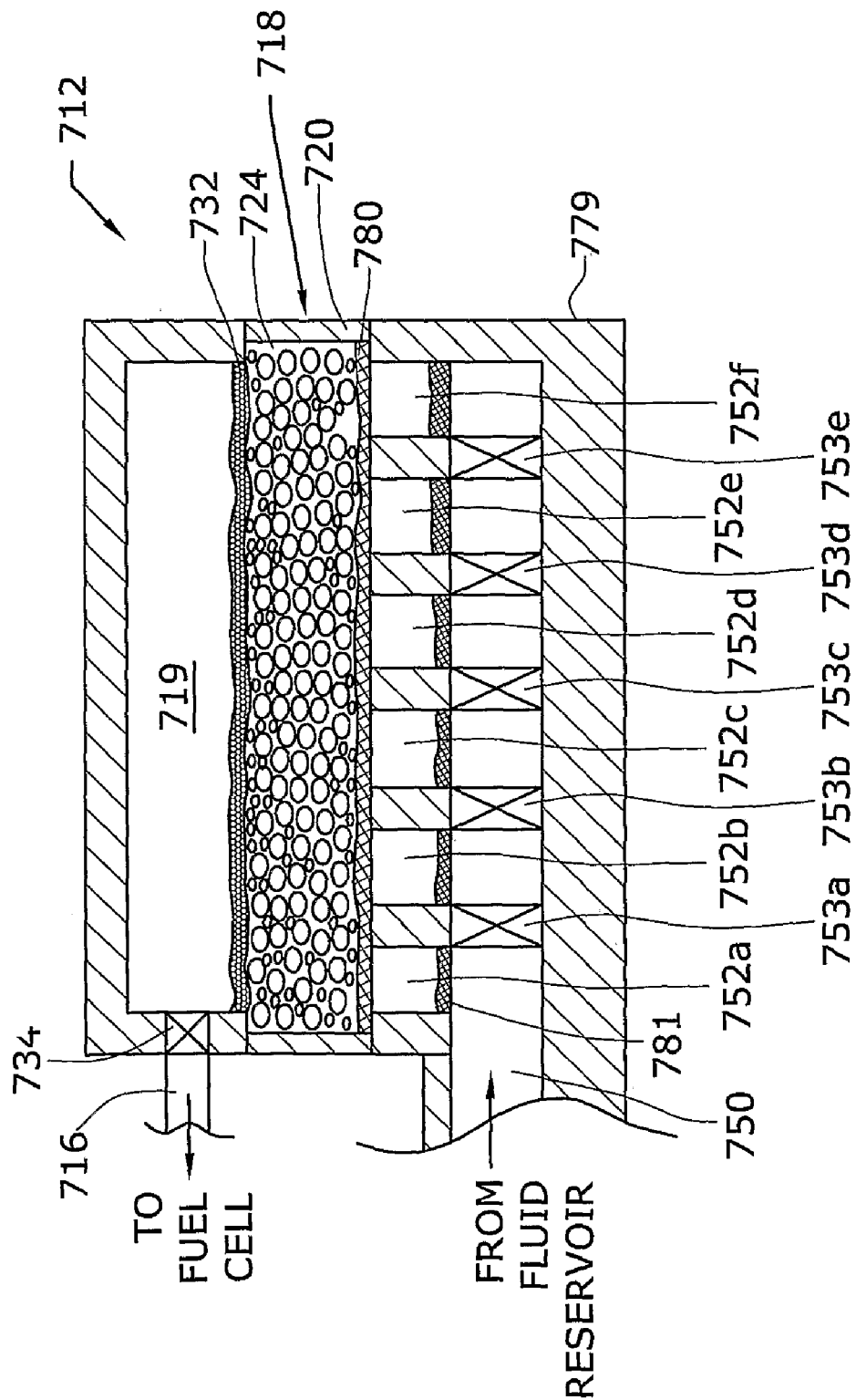
FIG. 12 is a sectional schematic view of another alternate embodiment of a gas-generating apparatus according to the present invention having a manifold with plurality of pressure-tripped valves.

Referring to FIG. 12, another configuration for a gas-generating apparatus 712 that allows access to successive flow channels 752a-f is shown. In this embodiment, which is similar to the embodiment shown in FIG. 11, access to downstream flow channels 752b-f is controlled by a series of valves 753a-e. Valves 753a-e are preferably pressure-triggered valves such as check valves or diaphragm valves. As fluid flows through a feeder tube 750, all valves 753a-e are closed so that the fluid must flow into flow channel 752a. As described above, flow channel 752a will clog with hardened slurry. When flow channel 752a is blocked, the pressure of the fluid in feeder tube 750 will increase until the first valve 753a is opened. The fluid may now flow into flow channel 752b. Preferably, once valve 753a is opened, it will not close again, such as by having an internal frangible member, as the flow pressure typically decreases once the new flow path is opened. As will be recognized by those in the art, each valve 753a-e may optionally be replaced with a frangible membrane. This process of clogging flow channels 752a-f and opening valves or breaking frangible membranes continues until all flow channels 752a-f are clogged and/or all solid fuel component 724 is spent.

Referring to FIG. 13, yet another gas-generating apparatus 812 is shown. Similar to previous embodiments, a reaction chamber 818 is contained within a housing 820. Housing 820 may be made of any material capable of containing a gas-generating reaction, preferably a material inert to the reaction, such as plastic or stainless steel. One end of housing 820 is sealed with a stopper 840. Stopper 840 is made of any material capable of sealing housing 820 against the escape of gas produced during reaction or liquid fuel component 822. The opposite end of housing 820 includes a valve 834, leading to the fuel cell (not shown) or a conduit leading to the fuel cell (not shown). Valve 834 is similar to other valves discussed herein and is preferably a check valve or a shut-off valve.

A solid fuel component 824 such as sodium borohydride lines the sidewalls of housing 820. Preferably, solid fuel component 824 is in powder or granular form, although solid fuel component 824 may be in tablet form. If solid fuel component 824 is provided in powder or granular form, a screen or mesh 827 is disposed over solid fuel component 824. The pore size of mesh 827 is sufficiently small to allow the liquid fuel component 822 access to solid fuel component 824 while retaining solid fuel component 824. Also, solid fuel component 824 may be divided into several compartments by dividers 825. Dividers 825 are made of a material capable of sealing each compartment so that liquid fuel component 822 cannot migrate from one divider to the next. Optionally, the granules of solid fuel component 824 may be encased in a time-release material, where different time-release materials are used, such as water-soluble materials of varying thicknesses. As such, some of the solid fuel component 824 may be used quickly, while the remaining solid fuel component 824 is reserved for use at a later point in time.

Liquid fuel component 822 is preferably water or a water-based gel, similar to the liquid fuel components discussed above. The water-based gel may be formed by mixing water with a hydrophilic compound, such as sodium polyacrylate crystals. Water gel is discussed above and disclosed in the '632 patent application, previously incorporated by reference. Liquid fuel component 822 is contained within a bladder 844. Bladder 844 is made of a deformable material which is substantially inert to liquid fuel component 822, such as rubber, silicone or thin-walled plastic. Preferably, bladder 844 is configured with a plurality of corrugations to allow bladder 844 to collapse more easily and in a controlled manner.

Fluidly connected to bladder 844 is a fluid conduit 882 that terminates in a nozzle 828. Fluid conduit 882 and nozzle 828 provide a fluid path to direct liquid fuel component 822 to a particular section of solid fuel component 824, such as a single compartment. Preferably, fluid conduit 882 and nozzle 828 are relatively small bore components, so that only a small quantity of liquid fuel component 822 may be dispensed at any given point in time. As shown in FIG. 13A, while nozzle 828 is shown as a single point nozzle in FIG. 13, nozzle 828' connected to fluid conduit 882' may include multiple outlets, such as, for example, a hollow ring fluidly connected to bladder 844 having multiple holes formed therein that serve as multiple and simultaneous fluid outlets.

A spring 830 is disposed on the end of bladder 844 opposite to fluid conduit 882 and nozzle 828. Spring 830 is preferably a constant force spring. Spring 830 may be any type of spring capable of providing a constant pulling force, such as a flat or clock spring. Preferably, spring 830 is made of a material substantially inert to liquid fuel component 822, such as plastic or stainless steel. One end of spring 830 extends through one end of bladder 844 to be fixedly attached to the opposite end of bladder 844 at or near fluid conduit 882. As such, spring 830 pulls the nozzle end of bladder 844 toward stopper 840. The pulling of spring 830 squeezes bladder 844, thereby forcing liquid fuel component 822 through fluid conduit 882 and out nozzle 828 to be introduced to solid fuel component 824. Gas is produced within reaction chamber 818. When the pressure within reaction chamber 818 reaches a threshold value, valve 834 opens to allow the gas to be transferred to the fuel cell. Alternatively, valve 834 is a shut-off valve and can be opened by a user or a controller. As bladder 844 empties, nozzle 828 moves toward stopper 840 as discussed further below, thus ensuring that liquid fuel component 822 is introduced to a new section of solid fuel component 824.

As spring 830 pulls on bladder 844, gas is continuously be produced by the introduction of liquid fuel component 822 to solid fuel component 824. However, it may not be desirable to produce gas without cessation. For example, when shut-off valve such as valve 834 is closed, the production of hydrogen should stop. Such a valve may be manually triggered, such as by the user or via a controller which monitors the usage of fuel by the fuel cell. When such a shut-off valve is closed, gas cannot be transferred out of housing 820 to the fuel cell. As such, pressure from the produced gas will build within reaction chamber 818 or housing 820. While the pressure may be relieved with, for example, a pressure relief check valve (not shown) or a secondary fuel cell, as discussed above, disposed in the sidewalls of housing 820, the production of gas should stop after closing a shut-off valve.

As such, gas-generating apparatus 812 is preferably provided with a pressure-sensitive sleeve 832 configured to stop the winding of spring 830. Pressure-sensitive sleeve 832 is provided adjacent stopper 840 and is adjacent to at least a portion of spring 830. Pressure-sensitive sleeve 832 is preferably made of a rigid material readily translated by the pressure within housing 820, such as plastic, resin, metal or the like. Pressure-sensitive sleeve 832 is slidably disposed within housing 820 spaced apart from stopper 840 to created a gap 831 so that pressure-sensitive sleeve 832 is free to translate within housing 820 into and out of gap 831. Pressure-sensitive sleeve 832 is biased away from stopper 840 by a spring 829, which may be any type of spring known in the art, such as a coiled compression spring or a gas or liquid hydrocarbon.

Once the pressure within reaction chamber 818 reaches a threshold level, the force provided by spring 829 biasing pressure-sensitive sleeve 832 away from stopper 840 is overcome so that pressure-sensitive sleeve 832 translates toward stopper 840. In so doing, pressure-sensitive sleeve 832 squeezes spring 830, thereby preventing spring 830 from winding further. As such, spring 830 can no longer pull on bladder 844 and no additional liquid fuel component is expelled from bladder 844. When gas is once again released from housing 820 to lower the pressure therewithin below the threshold level, spring 829 expands and pressure-sensitive sleeve 832 is translated back to its original position, thereby releasing spring 830. Spring 830 once again may pull on the nozzle end of bladder 844, and additional gas may be produced.

Figure 14:
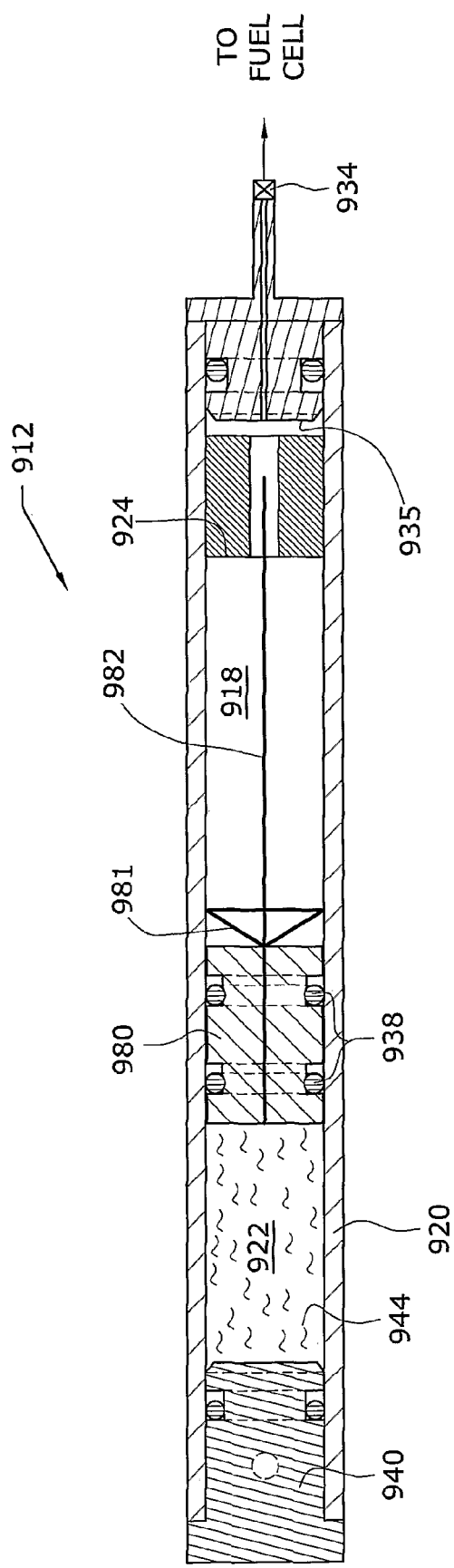
FIG. 14 is a sectional schematic view of another alternate embodiment of a gas-generating apparatus according to the present invention having a small-bore pressure-regulating tube connecting a liquid fuel component reservoir with a solid fuel tablet.

Yet another gas-generating apparatus 912 is shown in FIG. 14. Gas-generating apparatus 912 includes a housing 920 similar to the housings for the other gas-generating apparatus shown and discussed above. Housing 920 is generally configured to define a reaction chamber 918 containing a solid fuel component 924, such as sodium borohydride, and a liquid fuel component chamber 944 containing a liquid fuel component 922, such as water. As will be recognized by those in the art, any of the solid or liquid fuel components discussed in this application are appropriate for use with this embodiment.

A piston 980 slidably disposed within housing 920 divides the interior of housing 920 into liquid fuel component chamber 944 and reaction chamber 918. Piston 980 is sealingly disposed within housing 920. As such, piston 980 is preferably made from a deformable material which is non-reactive with either liquid fuel component 922, solid fuel component 924 or the gas produced by the reaction therebetween, and is covered with a gel-like material which enhances the sealing aspects of piston 980 and eases the sliding motion thereof, such as petroleum jelly. Alternatively, as shown in FIG. 14, piston 980 may be made from any rigid material which is similarly non-reactive as the deformable material discussed above, but includes at least one sealing element 938, such as a rubber or silicone O-ring or a gel-like lubricating material such as petroleum jelly. A sprag 981 or similar structure is provided adjacent piston 980 within reaction chamber 918 so that piston 980 is slidable only toward liquid fuel component chamber 944. Sprag 981 is preferably a plastic or metal concave disk or plate whose edges are sharp and can grip or anchor against the sidewalls of housing 920 to prevent movement in the direction opposite to the concavity.

One end of housing 920 is sealed with a stopper 940 such that liquid fuel component chamber 944 is defined by stopper 940, housing 920 and piston 980. Stopper 940 is made of any material capable of sealing housing 920 against the escape of gas produced during reaction or liquid fuel component 922, such as rubber, silicone or the like. Liquid fuel component 922 preferably entirely fills liquid fuel component chamber 944. Further, liquid fuel component 922 may be pressurized with hydrogen or a similar fuel gas so that the flow of liquid fuel component 922 out of liquid fuel component chamber 944 is enhanced. The pressurized gas may be contained in an elastic bladder disposed within liquid fuel component chamber 944 and configured to expand to expel liquid fuel component 922 from liquid fuel component chamber 944. Optionally, a check valve or pressure relief valve (not shown) is provided in the sidewalls of housing 920 which define liquid fuel component chamber 944 that allows air or other environmental gases into liquid fuel component chamber 944 to prevent a vacuum from forming therewithin and possibly stopping the motion of piston 980.

The opposite end of housing 920 includes a second stopper 935 which is similar in construction and materials as stopper 940. As such, reaction chamber 918 is defined by second stopper 935, housing 920 and piston 980. However, a valve 934 is disposed in second stopper 935 to create a flow path to the fuel cell (not shown) or a conduit leading to the fuel cell (not shown). Valve 934 is similar to other valves discussed herein and is preferably a shut-off valve or a check valve configured to open only when the pressure within reaction chamber 918 reaches a threshold level. Solid fuel component 924 is disposed on the sidewalls of housing 920 within reaction chamber adjacent to or near second stopper 935. Preferably, solid fuel component 924 is in a tablet-like form pressed to or otherwise adhered to the sidewalls of housing 920 to form a ring-like structure. Alternatively, solid fuel component 924 may be in granular or powder form and held into place against the sidewalls of housing 920 by a mesh or screen whose pore size is selected such that the granules of solid fuel component 924 may not pass through the pores, but which allows liquid fuel component 922 to pass therethrough to react with solid fuel component 924.

A fluid transfer tube 982 is provided through piston 980 to fluidly connect liquid fuel component chamber 944 with reaction chamber 918. Fluid transfer tube 982 may be any type of tubing or pipe capable of transferring liquid fuel component 922 to solid fuel component 924. However, fluid transfer tube 982 is preferably a small-bore, rigid tube made from a material which is substantially inert to liquid fuel component 922, solid fuel component 924 and the gas produced by the reaction therebetween. Preferably, the bore of fluid transfer tube 982 is between about 0.001 inches and 0.01 inches; more preferably, the bore of fluid transfer tube 982 is about 0.005 inches.

The length of fluid transfer tube 982 is selected such that the movement of piston 980 toward stopper 940 results in only a drop of fluid being expelled from the end of fluid transfer tube 982 onto solid fuel component 924. Fluid transfer tube 982 preferably has sufficient length such that when in an initial position, the free end of fluid transfer tube 982 extends through solid fuel component 924 to a point at or near second stopper 935. As such, when piston 980 moves, fluid transfer tube 982 is moved to a fresh supply of solid fuel component 924. Also, in the alternative, piston 980 does not necessarily move, such as if liquid fuel component 922 is pressurized with a bladder filled with a liquefied hydrocarbon provided within liquid fuel component chamber 944. In such a case, the liquefied hydrocarbon expands at constant pressure to expel liquid fuel component 922 from liquid fuel component chamber 944.

In operation, the flow of liquid fuel component 922 is initially triggered, such as by a user pressurizing liquid fuel component 922 or puncturing or removing a seal covering the free end of fluid transfer tube 982 (not shown). Liquid fuel component 922 then flows through fluid transfer tube 982 into reaction chamber and drops onto solid fuel component 924. Liquid fuel component 922 and solid fuel component 924 react to produce hydrogen. When sufficient pressure builds within reaction chamber 918, check valve 934 opens to allow the fuel gas to flow to the fuel cell (not shown) or, alternatively, a user or a controller opens shut-off valve 934. If the pressure within reaction chamber 918 increases further, a reaction chamber pressure $P_{918}$ eventually reaches a level where reaction chamber pressure $P_{918}$ pushes piston 980 toward stopper 940. However, additional increase in reaction chamber pressure $P_{918}$ will eventually prevent additional liquid fuel component 922 from flowing through fluid transfer tube 982, as when reaction chamber pressure $P_{918}$ is greater than liquid fuel component chamber pressure $P_{944}$, liquid fuel component 922 cannot flow into reaction chamber 918 due to the pressure gradient. In other words, the liquid fuel component chamber pressure $P_{944}$ needs to be higher than the reaction chamber pressure $P_{918}$ by at least a fixed amount, such as X psi. Fluid transfer tube 982 is preferably sufficiently long such that X equals 2 psi, for example, for fluid to flow through fluid transfer tube 982. When reaction chamber pressure $P_{918}$ is lowered, such as by transfer out of reaction chamber through valve 934, liquid fuel component 922 again flows through fluid transfer tube 982 so that additional gas may be produced. In other words, so long as the produced hydrogen is carried out of gas generating apparatus 912 at a rate sufficient to keep reaction chamber pressure $P_{918}$ relatively low, liquid fuel component 922 continues to be transported to reaction chamber 918.

Some examples of the fuels that are used in the present invention include, but are not limited to, hydrides of elements of Groups IA-IVA of the Periodic Table of Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$, $Mg(BH_4)_2$, or methanol clathrate compound (MCC) is a solid which includes methanol. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. When an aqueous form of $NaBH_4$ is utilized, the chamber containing the aqueous $NaBH_4$ also includes a stabilizer. Exemplary stabilizers can include, but are not limited to, metals and metal hydroxides, such as alkali metal hydroxides. Examples of such stabilizers are described in U.S. Pat. No. 6,683,025, which is incorporated by reference herein in its entirety. Preferably, the stabilizer is NaOH.

The solid form of the hydrogen-bearing fuel is preferred over the liquid form. In general, solid fuels are more advantageous than liquid fuels because the liquid fuels contain proportionally less energy than the solid fuels and the liquid fuels are less stable than the counterpart solid fuels. Accordingly, the most preferred fuel for the present invention is powdered or agglomerated powder sodium borohydride.

According to the present invention, the fluid fuel component preferably is capable of reacting with a hydrogen-bearing solid fuel component in the presence of an optional catalyst to generate hydrogen. Preferably, the fluid fuel component includes, but is not limited to, water, alcohols, and/or dilute acids. The most common source of fluid fuel component is water. As indicated above and in the formulation below, water may react with a hydrogen-bearing fuel, such as $NaBH_4$ in the presence of an optional catalyst to generate hydrogen.

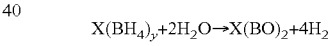

$$X(BH_4)_y + 2H_2O \rightarrow X(BO)_2 + 4H_2$$

Where X includes, but is not limited to, Na, Mg, Li and all alkaline metals, and y is an integer.

Fluid fuel component also includes optional additives that reduce or increase the pH of the solution. The pH of fluid fuel component can be used to determine the speed at which hydrogen is produced. For example, additives that reduce the pH of fluid fuel component result in a higher rate of hydrogen generation. Such additives include, but are not limited to, acids, such as acetic acid and sulfuric acid. Conversely, additives that raise the pH can lower the reaction rate to the point where almost no hydrogen evolves. The solution of the present invention can have any pH value less than 7, such as a pH of from about 1 to about 6 and, preferably, from about 3 to about 5.

In some exemplary embodiments, fluid fuel component includes a catalyst that can initiate and/or facilitate the production of hydrogen gas by increasing the rate at which fluid fuel component reacts with a fuel component. The catalyst of these exemplary embodiments includes any shape or size that is capable of promoting the desired reaction. For example, the catalyst may be small enough to form a powder or it may be as large as the reaction chamber, depending on the desired surface area of the catalyst. In some exemplary embodiments, the catalyst is a catalyst bed. The catalyst may be located inside the reaction chamber or proximate to the reaction chamber, as long as at least one of either fluid fuel component or the solid fuel component comes into contact with the catalyst.

The catalyst of the present invention may include one or more transitional metals from Group VIIIB of the Periodic Table of Elements. For example, the catalyst may include transitional metals such as iron (Fe), cobalt (Co), nickel (Ni), ruthenium (Ru), rhodium (Rh), platinum (Pt), palladium (Pd), osmium (Os) and iridium (Ir). Additionally, transitional metals in Group IB, i.e., copper (Cu), silver (Ag) and gold (Au), and in Group IIB, i.e., zinc (Zn), cadmium (Cd) and mercury (Hg), may also be used in the catalyst of the present invention. The catalyst may also include other transitional metals including, but not limited to, scandium (Sc), titanium (Ti), vanadium (V), chromium (Cr) and manganese (Mn). Transition metal catalysts useful in the present invention are described in U.S. Pat. No. 5,804,329, which is incorporated by reference herein in its entirety. The preferred catalyst of the present invention is $CoCl_2$.

Some of the catalysts of the present invention can generically be defined by the following formula:

$$M_a X_b$$

wherein M is the cation of the transition metal, X is the anion, and "a" and "b" are integers from 1 to 6 as needed to balance the charges of the transition metal complex.

Suitable cations of the transitional metals include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$), rhodium (IV) ($Rh^{4+}$), rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium (VIII) ($Os^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$), zinc ($Zn^{2+}$), cadmium ($Cd^{2+}$), mercury (I) ($Hg^+$), mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{3-}$), hydrogen phosphate ($HPO_4^{2-}$), dihydrogen phosphate ($H_2PO_4^-$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like. A preferred catalyst is cobalt chloride.

In some exemplary embodiments, the optional additive, which is in fluid fuel component and/or in the reaction chamber, is any composition that is capable of substantially preventing the freezing of or reducing the freezing point of fluid fuel component and/or solid fuel component. In some exemplary embodiments, the additive can be an alcohol-based composition, such as an anti-freezing agent. Preferably, the additive of the present invention is $CH_3OH$. However, as stated above, any additive capable of reducing the freezing point of fluid fuel component and/or solid fuel component may be used.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

While it is apparent that the illustrative embodiments of the invention disclosed herein fulfill the objectives of the present invention, it is appreciated that numerous modifications and other embodiments may be devised by those skilled in the art. For example, any of the valves herein may be triggered by an electronic controller such as a microprocessor. Further, in those embodiments including both a check valve (34, 234, 334, 434, 534, 634, 834, 934) and/or a shut-off valve (36, 834, 934), one or both of the valves may be omitted and/or the check valve and shut-off valve may be interchanged. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention. All publications discussed herein, including but not limited to patents, patent applications, articles, and books, are incorporated by reference in their entireties.

We claim:

1. A gas-generating apparatus comprising:
    a reaction chamber containing a solid fuel precursor;
    a reservoir containing a liquid fuel precursor; and
    a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the reaction chamber is a movable chamber disposed between the reservoir and an empty chamber.

2. The gas-generating apparatus of claim 1, wherein the fluid path comprises a nozzle disposed in a sidewall of the movable chamber.

3. The gas-generating apparatus of claim 2, wherein the nozzle comprises a valve.

4. The gas-generating apparatus of claim 2, wherein the nozzle comprises an opening.

5. The gas-generating apparatus if claim 2, wherein the movable chamber is biased toward the reservoir.

6. The gas-generating apparatus of claim 1, wherein the movable chamber is connected to an arm.

7. The gas-generating apparatus of claim 6, wherein the arm is configured to extend into the reservoir so that when the movable chamber is moved, the arm seals the fluid path.

8. The gas-generating apparatus of claim 6 further comprising a wheel connecting the movable chamber to the arm and a stopper operatively connected to the arm, wherein the stopper seals the fluid path when the chamber is moved.

9. The gas-generating apparatus of claim 8, wherein the stopper is movably disposed within a tube hingedly connected to the arm and hingedly and fluidly connected to the fluid path, wherein the stopper moves to seal the fluid path when the chamber is moved.

10. A gas-generating apparatus comprising:
    a reaction chamber containing a solid fuel precursor;
    a reservoir containing a liquid fuel precursor; and
    a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the reaction chamber is connected to a fuel transfer valve by a flexible tube.

11. A gas generating apparatus comprising:
a reaction chamber containing a solid fuel precursor;
a reservoir containing a liquid fuel precursor; and
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the fluid path comprises a tubular member having a free end extending into the reaction chamber, wherein at least one port is disposed in the free end, and wherein the solid fuel precursor and a wicking material are connected to the free end.

12. The gas-generating apparatus of claim 11, wherein the wicking material comprises sodium polyacrylate crystals in a fibrous matrix.

13. The gas-generating apparatus of claim 11 further comprising a fluid control valve disposed within the tubular member and a pressure transfer tube connecting the reaction chamber and the tubular member so that the fluid control valve may be triggered by the pressure within the reaction chamber.

14. A gas-generating apparatus comprising:
a reaction chamber containing a solid fuel precursor;
a reservoir containing a liquid fuel precursor; and
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the reaction chamber comprises an expandable bladder containing both the solid fuel precursor and the liquid fuel precursor, and wherein the fluid path is formed in a sleeve which separates the solid fuel precursor from the liquid fuel precursor, and wherein the liquid fuel precursor is in contact with the solid fuel precursor so that a reaction occurs between the liquid fuel precursor and the solid fuel precursor to produce a gas when the expandable bladder is in a collapsed configuration, and wherein the liquid fuel precursor is not in contact with the solid fuel precursor so that substantially no gas is produced when the expandable bladder has been inflated to a predetermined diameter.

15. The gas-generating apparatus of claim 14, wherein the expandable bladder is in the collapsed configuration when the pressure in the reaction chamber is below a predetermined level so that additional gas is produced, and wherein the expandable bladder is inflated when the pressure in the reaction chamber is above a predetermined level.

16. The gas-generating apparatus of claim 14 further comprising a fluid transfer path configured to transfer the gas produced by the reaction to a fuel cell.

17. A gas-generating apparatus comprising:
a reaction chamber containing a solid fuel precursor;
a reservoir containing a liquid fuel precursor;
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber;
a mesh piston slidably disposed within the reaction chamber in contact with the solid fuel precursor, wherein the mesh piston is configured to allow a by-product of a reaction between the solid fuel precursor and the liquid fuel precursor to pass therethrough;
a flexible tube extending through the mesh piston, wherein the flexible tube is the fluid path; and
a spring biasing the mesh piston toward the solid fuel precursor.

18. The gas-generating apparatus of claim 17, wherein the spring pushes the mesh piston through the by-product to a location of fresh solid fuel precursor as solid fuel precursor is consumed by the reaction.

19. A gas-generating apparatus comprising:
a reaction chamber containing a solid fuel precursor;
a reservoir containing a liquid fuel precursor;
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber; and
a piston slidably disposed between the reaction chamber and the reservoir, wherein the fluid path comprises a small-bore tubular member that extends through the piston.

20. The gas-generating apparatus of claim 19 further comprising a sprag disposed within the reaction chamber and adjacent to the piston, wherein the sprag is configured to allow the piston to move only toward the reservoir.

21. The gas-generating apparatus of claim 19 further comprising a bladder disposed within the reservoir, wherein the bladder is configured to expand in order to expel the liquid fuel precursor from the reservoir.

22. The gas-generating apparatus of claim 21 wherein the bladder contains a liquid hydrocarbon.

23. The gas-generating apparatus of claim 19, wherein the tubular member is sized and dimensioned to prevent the liquid fuel precursor from flowing through the tubular member until a threshold pressure differential between the reservoir and the reaction chamber is achieved.

24. A gas-generating apparatus comprising:
a reaction chamber containing a solid fuel precursor;
a reservoir containing a liquid fuel precursor; and
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the reservoir is a deformable bladder with a constant force spring fixedly attached to a first end of the bladder, wherein the constant force spring continuously pull the first end of the bladder toward a second end of the bladder to expel the liquid fuel precursor through the fluid path.

25. The gas-generating apparatus of claim 24 further comprising a pressure-triggered sleeve, wherein the pressure-triggered sleeve is configured to prevent the constant force spring from winding when the pressure in the reaction chamber reaches a threshold pressure.

26. The gas-generating apparatus of claim 24, wherein the fluid path comprises a nozzle fluidly connected to the bladder.

27. The gas-generating apparatus of claim 26, wherein the nozzle includes a single exit port.

28. The gas-generating apparatus of claim 26, wherein the nozzle includes a plurality of exit ports.

29. A gas-generating apparatus comprising:
a reaction chamber containing a solid fuel precursor;
a reservoir containing a liquid fuel precursor; and
a fluid path for introducing the liquid fuel precursor into the reaction chamber, wherein a predetermined portion of the liquid fuel precursor, which predetermined portion is less than all of the liquid fuel precursor, is introduced to the solid fuel precursor in the reaction chamber in response to a pressure within the reaction chamber, wherein the fluid path comprises multiple flow paths, wherein the multiple flow paths are fluidly connected such that the liquid fuel path flows to each flow path sequentially.

30. The gas-generating apparatus of claim 29, wherein each of the multiple flow paths has a different diameter.

31. The gas-generating apparatus of claim 30, wherein the diameters of the multiple flow paths decrease sequentially while a chamber provided beneath the multiple flow paths increases in diameter sequentially.

32. The gas-generating apparatus of claim 29, wherein each of the multiple flow paths is provided with a valve, wherein the valve is configured to restrict access to its associated flow path until a threshold pressure is achieved.

33. A gas-generating apparatus comprising:
a reaction chamber containing a solid fuel precursor;
a reservoir containing a liquid fuel precursor; and
a fluid path for introducing the liquid fuel precursor into the reaction chamber, wherein a redetermined portion of the liquid fuel precursor, which predetermined portion is less than all of the liquid fuel precursor, is introduced to the solid fuel precursor in the reaction chamber, wherein the fluid path comprises at least one movable point of introduction of liquid fuel precursor.

34. The gas-generating apparatus of claim 33, wherein the liquid fuel precursor is introduced at a plurality of locations in the solid fuel precursor.

35. The gas generating apparatus of claim 33, wherein the liquid fuel precursor, is introduced to the solid fuel precursor in the reaction chamber in response to a pressure within the reaction chamber.

36. A gas-generating apparatus comprising:
a reaction chamber containing a fuel, wherein the fuel reacts to form hydrogen, wherein the hydrogen is transported to a first device that consumes hydrogen and wherein the gas-generating apparatus further comprising a second device that consumes hydrogen, wherein said second device is in contact with the reaction chamber.

37. The gas-generating apparatus of claim 36, wherein the second device is a fuel cell with the anode side facing the reaction chamber and the cathode side facing ambient air.

38. The gas-generating apparatus of claim 37, wherein a movable cover is selectively covering the cathode side of the fuel cell.

* * * * *